(12) United States Patent
Way et al.

(10) Patent No.: US 11,418,259 B2
(45) Date of Patent: *Aug. 16, 2022

(54) APPARATUS AND METHOD FOR ANALOG ELECTRONIC FIBER DISPERSION AND BANDWIDTH PRE-COMPENSATION (EDPC) FOR USE IN 50 GBPS AND GREATER PAMN OPTICAL TRANSCEIVERS

(71) Applicant: NeoPhotonics Corporation, San Jose, CA (US)

(72) Inventors: Winston I. Way, Irvine, CA (US); Raghavendra V. Juluri, Pleasonton, CA (US); Konstantin Gennadiyevich Kuzmin, Minsk (BY)

(73) Assignee: NeoPhotonics Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/116,658

(22) Filed: Dec. 9, 2020

(65) Prior Publication Data

US 2021/0119703 A1    Apr. 22, 2021

Related U.S. Application Data

(63) Continuation of application No. 16/396,251, filed on Apr. 26, 2019, now Pat. No. 10,892,827.

(60) Provisional application No. 62/733,958, filed on Sep. 20, 2018.

(51) Int. Cl.
*H04B 10/2513* (2013.01)
*H04B 10/588* (2013.01)
*H04B 10/40* (2013.01)

(52) U.S. Cl.
CPC ....... *H04B 10/25137* (2013.01); *H04B 10/40* (2013.01)

(58) Field of Classification Search
CPC .................. H04B 10/505; H04B 10/6161
See application file for complete search history.

(56) References Cited

U.S. PATENT DOCUMENTS

| | | | |
|---|---|---|---|
| 5,880,870 A * | 3/1999 | Sieben | H04B 10/58 398/183 |
| 7,715,669 B2 | 5/2010 | Cunningham et al. | |
| 9,048,954 B2 | 6/2015 | Rylyakov et al. | |
| 9,722,722 B2 | 8/2017 | Way | |
| 10,020,886 B2 | 7/2018 | Castro et al. | |
| 10,120,210 B2 | 11/2018 | Dupuis et al. | |
| 2010/0196017 A1* | 8/2010 | Tanimura | H04B 10/616 398/159 |
| 2012/0301157 A1 | 11/2012 | Qian et al. | |

(Continued)

OTHER PUBLICATIONS

Gryunshpan et al., "Analog FIR Filter Integrated Circuit", First New Generation CAS, IEEE, 2017 (Year: 2017).*

(Continued)

*Primary Examiner* — Shi K Li
(74) *Attorney, Agent, or Firm* — Christensen, Fonder, Dardi & Herbert PLLC; Peter S. Dardi

(57) ABSTRACT

Cost-effective high-data-rate optical data transceivers are presented, comprising an electronic analog transversal filter simultaneously providing one or more of bandwidth compensation and forward impairment compensations for the transmitted optical signal.

21 Claims, 11 Drawing Sheets

(56) References Cited

U.S. PATENT DOCUMENTS

| | | | |
|---|---|---|---|
| 2015/0043917 A1* | 2/2015 | Simonneau | H04J 14/02 398/79 |
| 2015/0117865 A1* | 4/2015 | Sonoda | H04B 10/07955 398/140 |
| 2015/0249501 A1 | 9/2015 | Nagarajan | |
| 2016/0072588 A1 | 3/2016 | Houtsma et al. | |
| 2016/0380698 A1 | 10/2016 | Elahmadi et al. | |
| 2017/0104544 A1 | 4/2017 | Chung et al. | |
| 2017/0187463 A1 | 6/2017 | Nedovic | |
| 2018/0109318 A1 | 4/2018 | Castro et al. | |
| 2018/0191536 A1 | 7/2018 | Chen et al. | |
| 2019/0097728 A1* | 3/2019 | Frankel | H04B 10/40 |
| 2019/0305854 A1* | 10/2019 | Campos | H04B 10/614 |

OTHER PUBLICATIONS

Cole, "200GBASE-FR4 & -LR4 Baseline Proposal", IEEE, May 2016 (Year: 2016).*

Bt8960, "Single-Chip 2B1Q Transreceiver", Rockwell Semiconductor Systems, Inc., Dec. 1997.

Cole, "200GBASE-FR4 & -LR4 Baseline Proposal", IEEE, (May 2016).

Dai et al., "Electronic Equalizations for Optical Fiber Dispersion Compensation", Optical Engineering, vol. 46, No. 3, pp. 35006-1-35006-12, Mar. 2007.

Fonseca et al., "On the Use of Electrical Precompensation of Dispersion in Optical Single-Sideband Transmission Systems", Journal of Selected Topics in QuantumElectronics, vol. 12, No. 4, pp. 603-614, Jul./Aug. 2006.

Gryunshpan et al., "Analog FIR Filter Integrated Circuit", First New Generation CAS, IEEE, (2017).

Hoang et al., "Enabling High-Capacity Long-Reach Direct Detection Transmission With QAM-PAM Stokes Vector Modulation", Journal of Lightwave Technology, vol. 36, No. 2, Jan. 15, 2018.

Ibragimov et al., "Coherent Analog Low Power, Small Size 400/200/100Gb/s Receiver Based on Bipolar SiGe Technology", Optical Society of America, (2018).

Inoue et al., "Dispersion Pre-Compensation for PAM Transmission System Using 1-sample/symbol DAC and IQ Modulator", In: 2015 Optical Fiber Communications Conference and Exhibition (OFC), Jun. 15, 2015, E-ISBN: 978-1-5575-2937-4.

Ip et al., "Coherent detection in optical fiber systems", Optical Society of America, Optics Express, vol. 16, No. 2, Jan. 21, 2008.

Kikuchi, "Fundamentals of Coherent Optical Fiber Communications", Journal of Lightwave Technology, vol. 34, No. 1, Jan. 1, 2016.

Killey et al., "Electronic Dispersion Compensation by Signal Predistortion", Optical Society of America, (2006).

Kim et al., "High-speed spectral calibration by complex FIR filter in phase-sensitive optical coherence tomography", vol. 7, Issue 4, pp. 1430-1444, Mar. 14, 2016, [retrieved on Nov. 6, 2019], Retrieved from the Internet: <URL: https://www.osapublishing.org/boe/abstract.cfm?uri=boe-7-4-1430>.

Koc et al., "Adaptive Opto-Electronic Compensator for Excessive Filtering, Chromatic and Polarization Mode Dispersion", Optical Society of America, (2005).

Li et al., "Single-λ 112Gbit/s 80-km Transmission of PAM4 Signal with Optical Signal-to-Signal Beat Noise Cancellation", OFC, (2018).

Li et al., "168 GB/s/λ Direct-Detection 64-QAM SSB Nyquist-SCM Transmission over 80 km Uncompensated SSMF at 4.54 b/s/Hz net ISD using a Kramers-Kronig Receiver", Optical Networks Group, Department of Electronic & Electrical Engineering, UCL, (2017).

Lidon, "Digital Pre-compensation of Chromatic Dispersion in QPSK high speed telecom systems", 2011, [retrieved on Nov. 6, 2019], Retrieved from the internet: <URL: https://www.semanticscholar.org/paper/Digital-Pre-compensation-of-Chromatic-Dispersion-in-Lidon/4dca52a8a0b9182f2150dd4717ed36186853d024>.

Masuda et al., "112-Gb/s C-band Transmission Using 4-Level/7-Level Coding PAM with Chromatic-Dispersion Pre-compensation under 25-GHz Bandwidth-Limitation", OFC, (2017).

Morsy-Osman et al., "A Comparative Study of Technology Options for Next Generation Intra- and Inter-datacenter Interconnects", Optical Society of America, (2018).

Nagarajan et al., "Silicon Photonics-Based 100 Gbit/s, PAM4, DWDM Data Center Interconnects", Journal Optical Society of America, vol. 10, No. 7, p. B25-B36, Jul. 2018.

Pilori et al., "Direct-Detection Single-Sideband Systems: Performance Comparison and Practical Implementation Penalties", IEEE, ICTON, (2018).

Plant et al., "Optical Communication Systems for Datacenter Networks", OFC (2017).

Rudin, "Automatic Equalization Using Transversal Filters", IEEE spectrum, p. 53-59, Jan. 1967.

Winzer et al., "Advanced Optical Modulation Formats", Proceedings of the IEEE, vol. 94, No. 5, p. 952-985, May 2006.

Wu et al., "Integrated Transversal Equalizers in High-Speed Fiber-Optic Systems", Journal of Solid-State Circuits, vol. 38, No. 12, p. 2131-2137, Dec. 2003.

Zeng et al., "Weighted finite impulse response filter for chromatic dispersion equalization in coherent optical fiber communication systems", In: 2017 International Conference on Optical Instruments and Technology: Optoelectronic Devices and Optical Signal Processing, Jan. 2018.

Zhang et al., "Transmission of single lane 128 Gbit/s PAM-4 signals over an 80 km SSMF link, enabled by DDMZM aided dispersion pre-compensation", Optics Express, vol. 24, No. 21, Oct. 17, 2016.

Zhou et al., "112-Gbit/s PDM-PAM4 Transmission Over 80-km SMF Using Digital Coherent Detection Without Optical Amplifier", International Symposium on Communication Systems, Networks and Digital Signal Processing, IEEE, 10th, (2016).

Zhou et al., "Beyond 1 Tb/s Intra-Data Center Interconnect Technology: IM-DD OR Coherent?", Journal of Lightwave Technology, vol. 38, No. 2, Jan. 15, 2020.

Zhu et al., "Hilbert superposition and modified signal-to-signal beating interference cancellation for single side-band optical NPAM-4 direct detection system", Optics Express , vol. 25, No. 11, pp. 12622-12631, May 29, 2017.

Van Der Heide et al., "112-Gbit/s Single Side-Band PAM-4 Transmission over Inter-DCI Distances Without DCF Enabled by Low-complexity DSP", European Conference on Optical Communication, IEEE, p. 1-3, (Sep. 17, 2017).

Zhang et al., "Demonstration of CD Pre-compensated Direct Detection PAM4 40km Transmission in C-band Using DDMZM", 2016 Asian Communications and Photonics Conference, OSA, p. 1-3, (Nov. 2, 2016).

Zou et al., "Single-Lane 100Gb/s 4-PAM Transmission over 80km SSMF Based on K-K scheme and Integrated 10G TOSA" 2018 Optical Fiber Communications Conference and Exposition, OSA, p. 1-3, (Mar. 11, 2018).

International Search Report and Written Opinion for co-pending international application No. PCT/US2019/044951 dated Nov. 29, 2019.

Search Report from corresponding European Patent Application No. 19861546 dated Oct. 18, 2021.

* cited by examiner

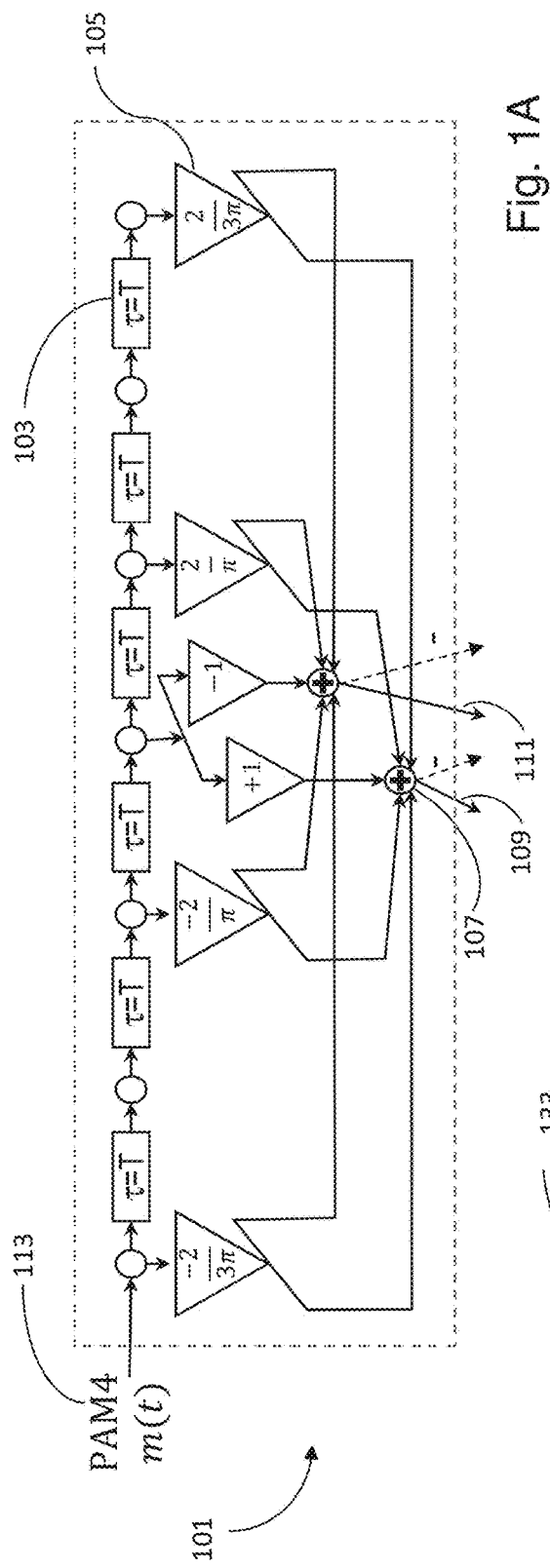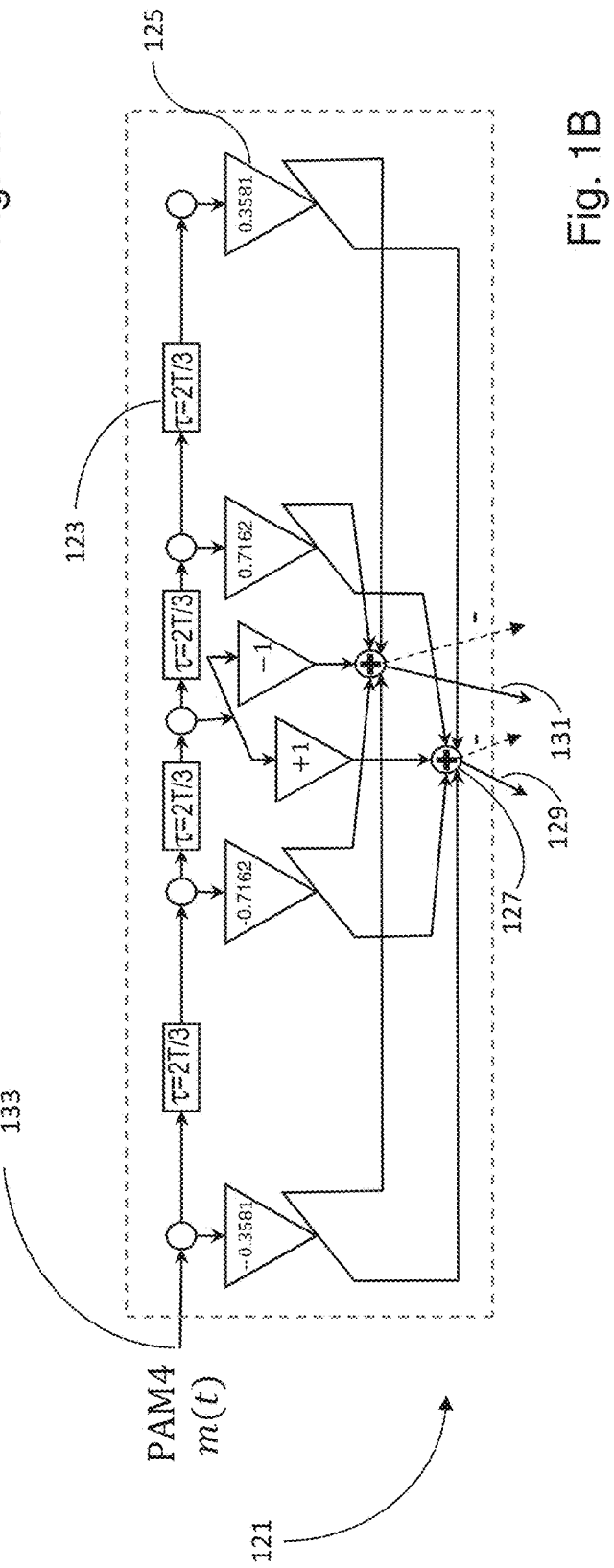
Fig. 1A
Fig. 1B

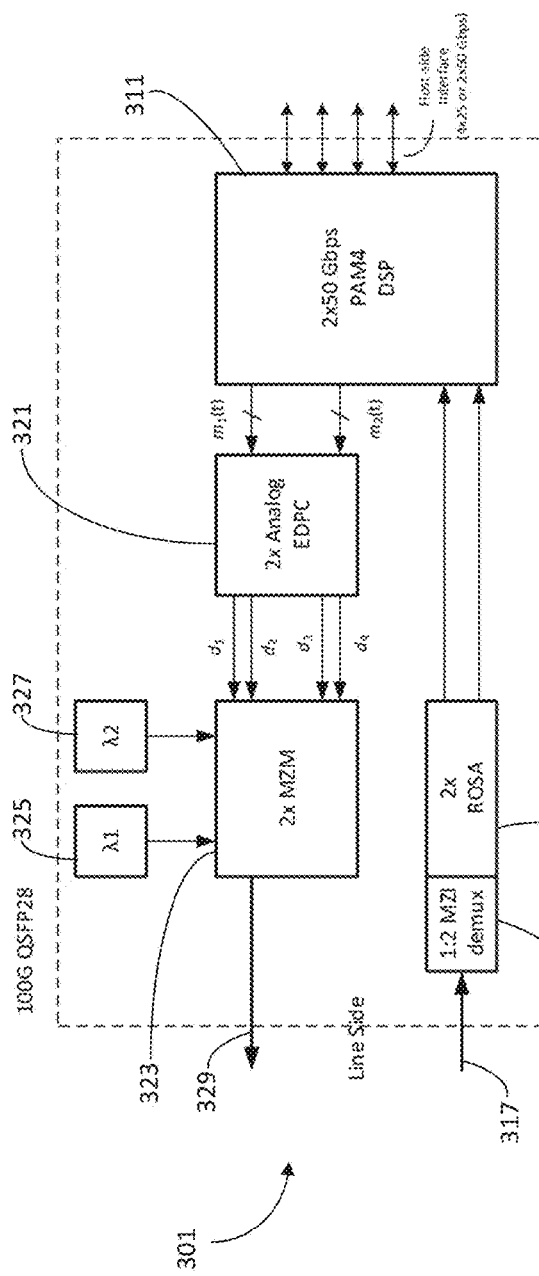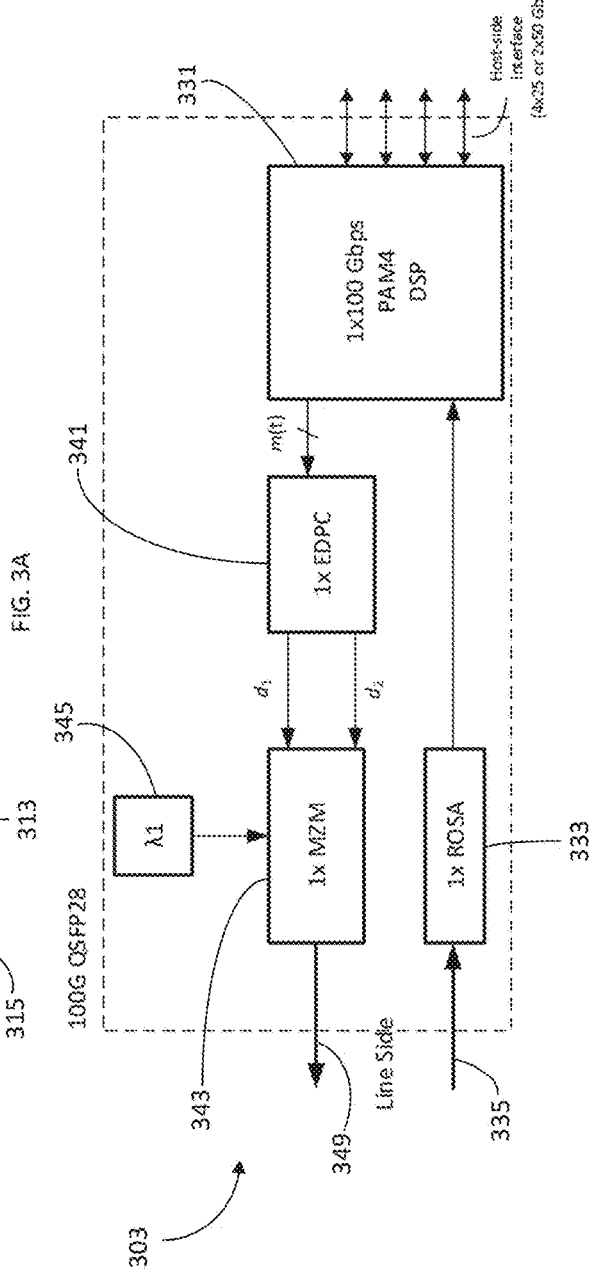
FIG. 3A
FIG. 3B

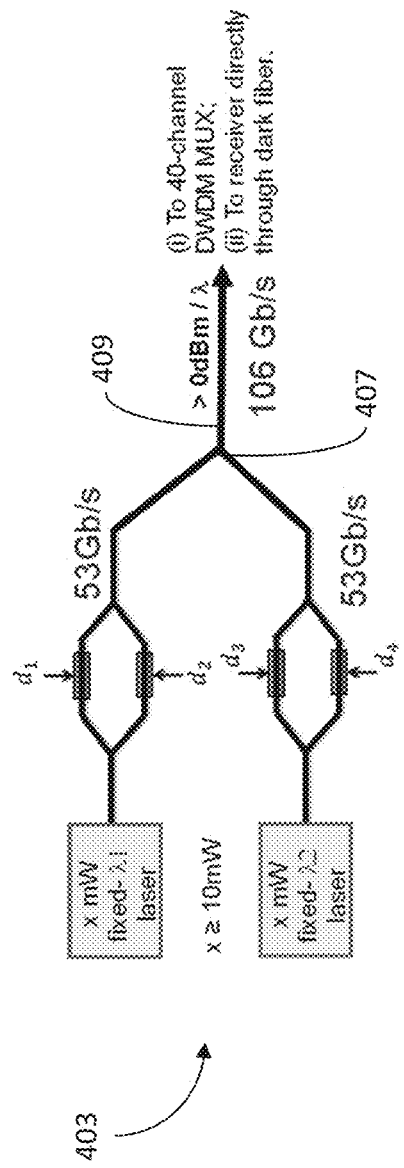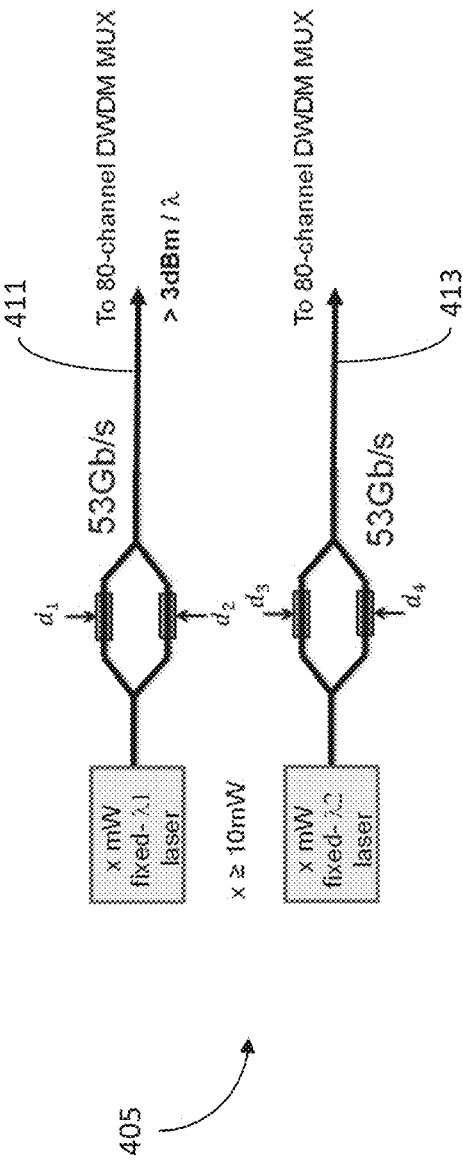

APPARATUS AND METHOD FOR ANALOG ELECTRONIC FIBER DISPERSION AND BANDWIDTH PRE-COMPENSATION (EDPC) FOR USE IN 50 GBPS AND GREATER PAMN OPTICAL TRANSCEIVERS

CROSS REFERENCE TO RELATED APPLICATIONS

This application is a continuation of U.S. patent application Ser. No. 16/396,251 filed on Apr. 26, 2019 to Way et al., entitled "Apparatus and Method for Analog Electronic Fiber Dispersion and Bandwidth Pre-Compensation (Edpc) for use in 50 Gbps and Greater Pamn Optical Transceivers", which claims priority to U.S. provisional application 62/733, 958 filed on Sep. 20, 2018 to Way et al., entitled "100 Gbps and Beyond Optical Module for up to 40 km Transmission Without Optical Dispersion Compensation", hereby incorporated herein by reference.

TECHNICAL FIELD OF THE INVENTION

The technical field of the invention relates to optical data transceivers, and in particular fiber-optic transceiver modules providing >=50 gigabits per second ("Gbps") per wavelength in high-throughput, short-to-medium reach fiber optic communications links such as in access networks, data centers, data-center interconnections, and campus-area networks.

BACKGROUND OF THE INVENTION

Legacy fiber-optic communications links convey binary data directly as binary, sending for instance a burst of "power on" to represent a binary "1", or a burst of "power off" to represent a binary "0". This type of encoding is referred to in various ways for various alternatives, and in most cases, taking certain liberties, can be collectively characterized as on-off keying ("OOK") The "bits" are conveyed at a bit-rate of 1/T bits per second or "bps". For contemporary high-speed fiber-optic links, bit rates are typically expressed as "Giga" ($10^9$) bits per second or "Gbps", and correspondingly T (the bit period) will be expressed in pico-seconds or "ps". For instance, 10 Gbps links having 100 ps bit periods are all but ubiquitous. Adhering to the terminologies developed for communications and control theories, the physical communication link and medium from the transmitter to the receiver or back is often called the communications "plant".

As other technology progresses and the demand to convey greater amounts of data increases, significant challenges arise in that the available communications plants cannot reliably support OOK for data rates significantly greater than 10 Gbps per optical wavelength. Sophisticated optical link systems utilizing coherent-optical technology with highly-capable digital signal processing (DSP) controls have emerged to provide 100 Gbps/wavelength and greater over existing communication plants for premium applications and at premium costs. However, there are a number of valuable applications that need greater than 10 Gbps but do not have the demands of such "premium applications", but attempting to use coherent systems for such less-demanding applications would not alleviate the "premium costs" associated with coherent technology. As a consequence, there is a need to establish more cost-effective ways to provide increased data capacity in important applications that use communications plant presenting less-than-premium requirements. Such conditions are common for instance when there are requirements for many independent interconnections and the length of the fiber plant is in an intermediate range, from as little as a few hundred meters up to about 40-80 km (sometime loosely referred to as "short-haul"). Such conditions are encountered in many valuable application spaces such as access networks, data centers, data-center interconnections, and campus-area networks.

One key method that has been particularly successful is to convert from OOK to multi-level signaling, conveying more than 1 bit of binary data for every period T. In such cases, the optical transmissions each period T are more densely valued "symbols" instead of just bits. In that case, the terminology for physical transmission rate changes from "bits per second" to the symbol rate, which is conventionally called the Baud ("Bd") rate. For instance, $25*10^9$ symbols per second (or thereabout) is referred to as "25 GBd" having a corresponding symbol period T=40 ps. It is also often to refer to such links by the effective bit rate; so a 25 GBd system may support for instance 50 Gbps (2 bits per symbol) or 100 Gbps (4 bits per symbol), but in any such case the symbol period T remains 40 ps.

Coherent systems take this dense-symbol approach to the practical extremes, having demonstrated for instance 600 Gbps on a single wavelength using 64 GBd and 12 bits per symbol (with a fraction of the data being siphoned into quality enhancement). The approaches described herein take a less extreme, but typically more cost effective, approach. The perhaps most basic and widely-pursued improvement is to replace OOK with 4-level pulse-amplitude modulation (PAM4) to provide 2 bits per symbol. The same principles can be readily applied to consider PAM8 (3 bits per symbol), PAM16 (4 bits per symbol) or any corresponding quadrature-amplitude modulation (QAMn), but there is a great deal of supporting technology in place for PAM4 so that application is of particular interest.

SUMMARY OF THE INVENTION

For the present invention, we propose a new method which exploits the technical finding that adding an analog linear equalizer chip to a transceiver, for example, that uses a short-haul 100 Gbps PAM4 DSP chip (which converts 4×25 Gbps or 2×50 Gbps on the host-side to 2×50 Gbps on the line-side) can improve the performance in marginal or inaccessible applications for that data rate. The added analog chip can provide electronic dispersion pre-compensation (EDPC) while the PAM4 DSP can provide electronic dispersion post-compensation for a distance up to 40 km or longer and other filtering enhancements without any optical dispersion compensation. The enhancements provided in this manner are markedly more efficient in size, cost, and power consumption than corresponding upgrades of the DSP capabilities, or adding fixed or tunable optical dispersion compensators. The EDPC chip can provide any of the following enhancements: (a) an approximation of Hilbert transform of a PAM4 signal to transform it into a single-sideband (PAM4-SSB) signal, together with additional fiber dispersion pre-compensation; and (b) dispersion pre-compensation for a conventional double-sideband (PAM4-DSB) PAM4 signal. The conventional, commercially available digital PAM4 chip for the transceiver takes care of the host-side interface, FEC, and strong line-side post-compensation equalizers. The operation principle works for 50 Gbps and 100 Gbps per wavelength supported by current transceiver standards, and can be equally applied to the higher data rates that will emerge for future transceivers. To increase the transmission distance beyond 40 km SSMFs, one can increase the number of equalizer taps in an EDPC (limited by power consumption constraint of a pluggable module) and/or further add a simple passive optical dispersion compensator to keep the residual fiber dispersion range within a 40 km window. Passive (fixed) dispersion compensation elements are known in the art and commercially available from Proximion AB. In this case, since the distance would be greater than 40 km, there would necessarily be one or two optical amplifiers that could additionally be used to compensate for the loss caused by the passive optical dispersion compensator.

A number of OSSB schemes for binary data transmission have been proposed to use an analog Hilbert transformer (note that a digital Hilbert transformer can also be used, but it would require a new DSP chip). For example, [8, 9] was for baseband 10 Gbps NRZ signals, and [10] was for microwave-subcarrier 2.5 Gbps NRZ signals.

In a first aspect, the invention pertains to an optical transceiver module for n-level pulse-amplitude modulated (PAMn) optical symbols with n≥2, providing an interface between electronic data signals on a host and optical symbols transmitted through an optical-communication plant at a Baud rate, the transceiver comprising a receiver section, a PAMn digital signal processing (DSP) circuit, a transmitter section, and an analog transversal filter circuit. The receiver section can comprise at least one photoreceiver to convert received optical signals into analog electrical signals. The PAMn DSP circuit generally can provide at least logical interface to the electronic host data, forward error correction (FEC) capabilities, analog-to-digital conversion of the electrical signals from the photoreceiver(s), digital adaptive filtering of the converted received signal(s), and reconstruction of the filtered received signal(s) into data. The transmitter section generally comprises at least one laser and at least one interference modulator. The analog transversal filter circuit is configured as an electronic dispersion pre compensator (EDPC) to filter multilevel transmission signals such as PAMn signals provided by the PAMn DSP, in which the filtered signals emitted from the EDPC are connected to signal inputs of the interference modulator. In variants of this aspect, electrical current necessary to drive the modulator electrodes according to the filtered signal voltage may be provided by an electronic amplifier external to the EDPC, or that current may be provided directly by amplifiers integrated within the EDPC.

In a further aspect, the invention pertains to a method for extending the transmission distance with readable symbols of an optical transmitter operating with a PAMn modulation, in which the method comprises conditioning an analog modulator signal from the PAMn processor using an analog transversal filter circuit to perform an approximate Hilbert transform, dispersion pre-compensation, or both to form a conditioned modulator signal, and modulating optical laser light with optical interference modulator based on the conditioned modulator signal.

In another aspect, the invention pertains to a method for determining the tap weights of a an analog transversal filter circuit configured to condition an analog modulator signal from the PAMn processor to perform an approximate Hilbert transform, dispersion pre-compensation, or both to form a conditioned modulator signal, in which the method comprises iteratively correcting the tap weights to improve the dispersion for a composite range of lengths of fiber plant.

BRIEF DESCRIPTION OF THE DRAWINGS

FIG. 1A depicts analog transversal filter schematics to approximate a Hilbert transform using delay units of one symbol period.

FIG. 1B depicts analog transversal filter schematics to approximate a Hilbert transform using delay units of two-thirds of a sampling period.

FIG. 3A depicts a block diagram for optical transceiver modules to provide 100-Gbps links using PAM4 on two 50-Gbps wavelengths.

FIG. 3B depicts a block diagram for optical transceiver modules to provide 100-Gbps links using PAM4 on one 100-Gbps wavelength.

FIG. 4A diagrams an optical configuration of dual-wavelength transmitters having optical output combined on a single optical fiber.

FIG. 4B diagrams an optical configuration of dual-wavelength transmitters having optical output remaining separate on individual output fibers.

DETAILED DESCRIPTION OF THE INVENTION

Figure 2A:
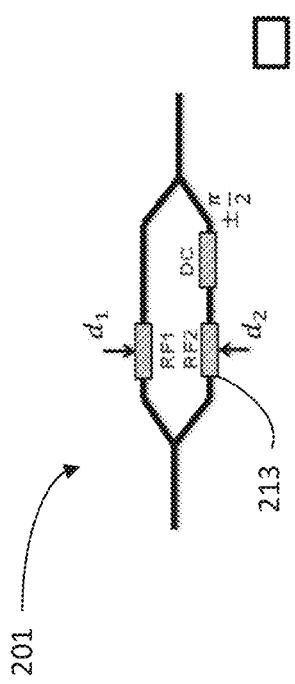
FIG. 2A depicts an optical Mach-Zehnder modulator configurations for providing SSB modulation using dual drive capabilities, where $d_1$ and $d_2$ are independent.

Optical data transceivers are described herein that further comprise an electronic analog transversal filter to provide key signal conditioning functions in the transformation of PAMn-formatted (n≥2) digital data into the suitably modulated optical signal emitted from the optical transmitter of the transceiver. Herein, that electronic analog transversal filter circuit shall be referred to as the Electronic Dispersion Pre-Compensator (EDPC). The following signal-conditioning methods are impartially applicable to C-, L-, and O optical bands and any other practically useful optical-wavelength bands in an optical fiber link. The transceivers with the EDPC as described herein can provide very energy efficient approaches for expanding the transmission distances while also providing a small foot print for the incorporation into standard module formats that should be followed for incorporation into conventional systems. Descriptions and examples herein distinguish parallel optical data streams as "per wavelength". For transceivers using parallel fibers, "per wavelength" therein may be equally taken to mean "per fiber", even if the wavelengths between fibers do not differ. The invention accommodates parallel wavelengths/parallel fibers through simple integrated and/or discrete replication. The descriptions herein should be assumed to apply to any reasonable number of parallel wavelengths and/or parallel fibers supported by the fiber plant.

In general, the transceivers herein are suitable for various PAMn modulation formats and other direct-detect multi-bit symbol formats, but since PAM4 is widely adopted in existing deployments, the discussion focuses on PAM4 for more specific description. PAM4 modulation is already intensively used for short-haul transmission systems, as shown in Table 1 below. Table 1 refers to IEEE Standards or to Multi-Source Agreement (MSA) standards related to PAM4 modulation. All but the final entry use 1.3 µm wavelengths to avoid optical fiber chromatic dispersion in standard single-mode fibers (SSMFs). Operating at 1.3 µm wavelengths, however, presents certain other issues such as (a) a higher optical fiber transmission loss (≤0.35 dB/km) than that at 1.55 µm (≤0.20 dB/km), and (b) technology for 1.3 µm does not provide DWDM (dense-wavelength-division-multiplexing) wavelengths to increase the number of wavelengths supported and hence total transmission capacity for each fiber.

As a result, there is a commercial 100 Gbps optical transceiver module [6] using two 1.55 µm wavelengths to carry 100 Gbps data for data center Inter-connection (DCI). Each of the two wavelengths in the transceiver module carries approximately 50 Gbps at 25 GBd based on PAM4 modulation. However, the 50 Gbps PAM4 wavelength is highly sensitive to optical fiber chromatic dispersion inherent in the fiber plant. It cannot even tolerate the chromatic dispersion of just a few kilometers of SSMF, and therefore would require a tunable optical dispersion compensator (ODC) in the transmission link. This active tunable ODC is a complex and management-intensive item of optical hardware and makes the optical network operation very complex and cumbersome. To resolve this problem, there has been intensive research [7] on proposals to remove optical fiber dispersion compensation for 50 Gbps or 100 Gbps PAM4 per wavelength transmission. However, almost all of the proposals are related to new digital signal processing (DSP) algorithms, which would require a significant investment in making, acquiring, and operating custom DSP ASICs.

Another application which would require short-distance chromatic dispersion (CD) compensation is 100 Gbps/wavelength over 10 km 1.3 µm CWDM wavelengths. The nominal wavelengths defined in 400G-LR4 [1] are 1271, 1291, 1311, and 1331 nm, each with a drift/tolerance of ±6.5 nm. Many typical optical transmitters exhibit "chirp", where the optical wavelength skews a little when the transmitter level is changed to a new symbol. When an optical transmitter has such a chirp it can introduce a larger dispersion penalty. That dispersion penalty is also not uniform for all channels and will be greater for the longer wavelengths (e.g. 1331 nm) if the chirp is positive, or greater for the shorter wavelengths (e.g. 1271 nm) if the chirp is negative. There are proposals to increase the number of CWDM wavelengths to 8, which would make the disparity even greater.

TABLE 1

| Optimal Device | Wavelength | Standard or MSA | Number of wavelengths & fibers | Link distance | Baud rate (Gbaud) | Application |
|---|---|---|---|---|---|---|
| EML SiPho | 1.3 µm CWDM | 400G-FR4 [1] | 4 λ, 2 fibers | <2 km | 53.125 | Intra-DC |
| EML | 1.3 µm CWDM | 400G-LR4 [1] | 4 λ, 2 fibers | <10 km | 53.125 | Inter-DC Inter-CO |
| SiPho | ~1.31 µm | 400GBase-DR4 [2] | 1 λ, 8 fibers | <500 m | 53.125 | Intra-DC |
| EML DML | 1.3 µm LAN-WDM | 400GBase-FR8 [2] | 8 λ, 2 fibers | <2 km | 26.5625 | Intra-DC |
| EML | 1.3 µm LAN-WDM | 400GBase-LR8 [2] | 8 λ, 2 fibers | <10 km | 26.5625 | Inter-DC Inter-CO |
| SiPho | ~1.31 µm | 200GBase-DR4 [2] | 1 λ, 8 fibers | <500 m | 26.5625 | Intra-DC |
| EML DML | 1.3 µm LAN-WDM | 200GBase-FR4 [2] | 4 λ, 2 fibers | <2 km | 26.5625 | Intra-DC |
| EML | 1.3 µm LAN-WDM | 200GBase-LR4 [2] | 4 λ, 2 fibers | <10 km | 26.5625 | Inter-DC Inter-CO |
| EML SiPho | ~1.31 µm | 100G-FR [1] | 1 λ, 2 fibers | <2 km | 53.125 | Intra-DC |
| EML | ~1.31 µm | 100G-LR [1] | 1 λ, 2 fibers | <10 km | 53.125 | Inter-DC Inter-CO |
| EML SiPho | 1.55 µm DWDM (non-standard) | 100G-ER/ZR [3,4,5] | 48 λ, 2 fibers | <40~80 km | 28.125 | Inter-DC Inter-CO |

("DC" = Data Center; "CO" = Central Office, e.g. access networks, EML = Externally Modulated Laser, DML = Directly Modulated Lasers, SiPho = Silicon Photonics)

Yet another application that requires CD compensation for 50 Gbps/wavelength or 100 Gbps/wavelength at 10-20 km is front-haul and back-haul links feeding wireless/mobile networks. For service areas where there is insufficient numbers of optical fibers, CWDM or DWDM is needed to support the required data bandwidths and fiber CD is likely to cause significant system performance penalty. In such cases, identifying an electronic CD compensation method will be practically imperative.

PAM4 (Or PAMn) OSSB

Four-level Pulse-Amplitude Modulation (PAM4) data symbols can be transmitted on an Optical Single Sideband (OSSB) optical carrier using known data-formatting and optical modulation techniques. This is well-known to compress the transmitted optical bandwidth and thereby reduce the chromatic dispersion impairments accumulated by the signal as it propagates along a length of fiber. A general description of a PAM4-based transceiver is found in U.S. Pat. No. 7,380,993 entitled "Optical Transceiver for 100 Gigabit/Second Transmission," incorporated herein by reference. An embodiment of a transceiver described herein can configure an EDPC to approximate a Hilbert Transform of the electrical PAM4 data to condition the electrical signal applied to the optical modulator for PAM4 OSSB transmission. Corresponding processing of PAMn data symbols can be performed by generalizing the discussion of this section to account for the corresponding data symbols.

An optical SSB signal can be mathematically expressed as $$\text{OSSB Signal} = m(t)\cos(\omega_c t) + \hat{m}(t)\sin(\omega_c t) \quad (1)$$

where m(t) is the modulating signal (which can be a wideband digital or narrowband microwave signal), $\hat{m}(t)$ is its Hilbert transform, and $\omega_c$ is the optical carrier frequency. In the present embodiment, m(t) can be a 50 Gbps or a 100 Gbps PAM4 signal, or could readily be at an higher data rates such as PAMn (n≥4) where other elements of the optical link could support such higher rates. A Hilbert transformer is an all-pass filter that provides a −90-degree phase shift at all positive frequencies, and a +90-degree phase shift at all negative frequencies. The core motivation of OSSB is to remove half of the spectral components compared to a conventional optical double sideband (ODSB) signal, i.e., the spectral components on either the positive or negative frequency side of an optical carrier are suppressed as much as possible. This in turn
 a) reduces the accumulation fiber chromatic dispersion effects, including signal fading and signal-to-signal beat interference following square law detection, and
 b) enables post-detection compensation of the accumulated chromatic dispersion in the electrical domain.

An analog Hilbert transformer can be approximated by a tap-delay line-based finite-impulse-response filter (FIR) with a limited number of taps [9, 11]. The tap-delay line-based finite impulse filter is an alternative name for the analog transversal filter. Due to the limited number of taps, the sideband suppression is not ideal. The fewer the taps the more residual power in the suppressed sideband is retained. According to [11], the tap weights in an analog Hilbert transformer are given as follows:

$$\text{For integer sample delay: } h(n) = \begin{cases} 0, & \text{for } n \text{ even} \\ \dfrac{2}{n\pi}, & \text{for } n \text{ odd} \end{cases} \quad (2)$$

$$\text{For arbitrary delay: } h(n) = \frac{2}{\pi} \frac{\sin^2\left[\frac{\pi}{2}(n-\tau)\right]}{(n-\tau)} \quad (3)$$

where n corresponds to the n-th tap relative to the center tap (with n values of taps toward the input form the center tap being negative) and τ is the tap delay in samples. In general, the number of taps in the analog circuit is at least three, in further embodiments at least five, and in other embodiments from 5 to 25. The weight of the center tap is +1 or −1 as described further below. In simpler symmetrical circuits, the number of taps is odd, although conceivable structures have a structure with an even number of taps. A person of ordinary skill in the art will understand that additional ranges of tap numbers within the explicit ranges above are contemplated and are within the present disclosure.

FIGS. 1A and 1B depict an EDPC circuit configuration to approximate a Hilbert transform and generates the filtered signals $d_i = [\pm m(t) + \hat{m}(t)]$ for the optical modulator. The adder portion of the EDPC actually provides two coordinating outputs, one for $[+m(t)+\hat{m}(t)](+1.0$ coefficient on the center tap) and one for $[-m(t)+\hat{m}(t)](-1.0$ coefficient on the center tap). FIG. 1A utilizes a finite impulse response filter 101 with a unit delay period of T with taps 103 with tap weights obtained from Eq. (2). T is the symbol rate. Output from taps 103 go to amplifiers/attenuators 105 that are summed at output unit 107 for sending the summed transformed signal (Eq. (4) below) to output 109. Alternative center amplifiers/attenuators can be provided to a further output 113 the negative of the original signal added to the Hilbert transform (Eq. 5 below), which is used for driving the modulators as described below. The alternative center amplifier/attenuator can be provided by having a single tap-weight amplifier/attenuator providing both positive and negative outputs. Amplifiers/attenuators 105 determine the tap weights, which as shown are from left to right, −2/(3τ) (n=−3), −2/τ(n=−1), 1 or −1 (n=0), 2/τ(n=1) and 2/(3τ) (n=3). Since Eq. (2) dictates that even tap weights be set at zero, in this example the outer two tap-weight amplifiers/attenuators are assigned to delays of ±3T respectively in order to sustain five non-negligible tap weights. The n=0 tap is set to provide the untransformed input that is added to the transformed signal of Eqs. 2 and 3. Similarly, FIG. 1B depicts an EDPC circuit configuration 121 based on a unit delay of (2/3)T and taps 123 that derive tap weights from Eq.(3) to generate the corresponding filtered signal. Output from taps 123 go to amplifiers 125 that are summed transformed signal (Eq. (4) below) at 127 for output 129. For this embodiment, the tap weights are ascertained from Eq. (3) using a delay unit of 2T/3. Again, alternative center amplifiers/attenuators can be provided to a further output 131 the negative of the original signal added to the Hilbert transform (Eq. 5 below), which is used for driving the modulators as described below. For reasons and results described subsequently herein, the preferred balances among the signal bandwidth, tap-delay spacing, and tap numbers vary depending on the nature of the application. For example, the configuration depicted in FIG. 1B, with further modification of the tap weights as subsequently described, has been used to demonstrate excellent transmission performance for 50 Gbps/wavelength at DWDM wavelengths and distances up to 40 km, also subsequently described.

The filtered signal is only part of the transformation of PAM4 data into a PAM4 OSSB optical signal. It is further desired to provide an optical carrier with both in-phase and quadrature-phase modulation according to Eq.(1). That modulation is preferably provided by using the signals from the EDPC to drive interferometric optical modulators, especially the Mach-Zehnder type optical modulator (MZM).

This can be achieved by using either a dual-drive basic MZM (DDMZM) 201 or an IQ nested MZM 203, as shown in FIGS. 2A [9] and 2B, respectively. IQ nested MZM 203 comprises an I MZM 205 and a Q MZM 207, that themselves for the respective arms 209, 211 of an MZM in which they are nested. The basic MZM 201 of FIG. 2A is generally preferred in appropriate applications for its simplicity. The nested IQ MZM 203 of FIG. 2B can provide somewhat better range of signal integrity for applications that might be otherwise marginal, but such embodiments generally would involve additional inverting amplifiers for the EDPC signals and thereby have greater power requirements . . . MZM modulators comprise semiconductor optical waveguides interfaced with RF electrodes. Indium phosphide (InP) based MZMs are particularly desirable for size, efficiency and performance considerations, although lithium niobate based modulators are commercially available and other semiconductor/electro-optic modulator types can be used . . . InP based IQ MZMs are commercially available from NeoPhotonics Corp. and are found in their High Bandwidth Coherent Driver Modulator (HB-CDM) product. Also, note that the electrical signal amplitude required to drive the passive electrodes 213 of the MZMs is substantially less than conventional OOK or PAM4 signals. This is because an OSSB signal requires a high ratio of optical carrier-to-signal beating to signal-to-signal beating. As a result, it is possible to use the amplified output signals (shown in FIG. 1) from EDPC to directly drive MZMs without additional driver amplifiers.

The output of the EDPC chip can include basic amplifiers suitable to directly drive the MZM electrodes. In alternative embodiments, an analog electrical amplifier is used to amplify the output of the EDPC chip to supply driving current to the MZM electrodes. The modulator signals from the EDPC are reflected in the following equations, with Eqs. (4) and (5) applying to FIG. 2A and FIGS. (6) and (7) applying for FIG. 2B:

$$d_1 \propto [m(t)+\hat{m}(t)] \quad (4)$$

$$d_2 \propto [-m(t)+\hat{m}(t)] \quad (5)$$

$$-d_{1b} = d_{1a} \propto [m(t)+\hat{m}(t)] \quad (6)$$

$$-d_{2b} = d_{2a} \propto [-m(t)+\hat{m}_1(t)] \quad (7)$$

The configuration of the EDPC chip with respect to the MZM then eliminates the need for an otherwise required transmitter driver amplifier, further reducing the associated cost, size, and significant power consumption. As shown in FIGS. 1A and 1B, although a plurality of FIR elements can be used in a single chip or multiple chips, a single FIR can be configured to produce the output for both $d_1$ and $d_2$. With respect to Eqs. (6) and (7), the EDPC chip can further comprise buffer amplifiers receiving the output of a summing unit to direct the signal to the output. The buffer amplifier can be readily configured to output either or both the positive and negative outputs and can function as an integrated driver. The output units (107 FIG. 1A and 127 FIG. 1B) can comprise both a summation unit and a buffer amplifier, and for appropriate embodiments, buffer amplifiers can output both a positive and negative output, shown in a dashed line in FIGS. 1A and 1B.

Chromatic Dispersion (CD) Pre-Compensation

To further improve the transmission distance, we describe alternative embodiments to include partial fiber dispersion pre-compensation in the analog EDPC. Since the actual length of the transmission link is typically not available to the transceiver, the CD at the receiver end has to be either estimated or compensated adaptively. The estimation is unlikely to be used in practice due to the additional power consumption involved in making the estimation. The maximum chromatic dispersion that could be compensated adaptively is limited by the power consumption-constrained number of taps in the receiver's adaptive equalizer provided by the short-haul PAM4 chip. For illustration purposes, it can be presently assumed that receiver's adaptive equalizer is capable to compensate CD corresponding to a maximum transmission length of L. Due to the symmetric nature of the adaptive equalization, that means that the range of the CD that could be compensated by the receiver's adaptive equalizer is between $-CD_L$ and $+CD_L$. We find that one can efficiently extend the meaningful optical transmission range by pre-compensating the dispersion corresponding to a fixed equivalent of a transmission distance of L at the transmitter side, allowing up to double the transmission distance.

To elaborate, consider the proposed pre-compensation approach in the two limiting cases:
1) Transmission distance is zero: At the transmitter side the dispersion with the opposite sign ($-CD_L$) would be applied to the signal. This value can be handled by the receiver's adaptive equalizer since it is within its compensation range.
2) Transmission distance is 2L. At the transmitter side the dispersion corresponding to the transmission length L with the opposite sign ($-CD_L$) would again be applied to the signal thus pre-compensating half of the transmission length. After propagating a distance 2L in the fiber, at the receiver's end the residual CD will be equal to the $CD_L$. This value can again be handled by the receiver's adaptive equalizer since it is still within its compensation range.

Consequently, in these embodiments, the analog EDPC is designed to simultaneously provide the combined Hilbert transform and dispersion pre-compensation. This is achieved by convolving the tap weights of the Hilbert transformer with the tap weights of the dispersion pre-compensating FIR. The tap weights of the CD pre-compensation FIR can be obtained by calculating the inverse Fourier transform of the conjugate of the dispersive fiber transfer function H(f) for a length L of the fiber plant [8].

$$H(f) = \exp\left(\frac{j\pi D L \lambda^2 f^2}{c}\right) \quad (8)$$

where D is the fiber dispersion parameter, L is the fiber length, $\lambda$ is the signal's wavelength, f is the low-pass equivalent frequency and c is the speed of light.

The optical transceiver module based on EDPC with Hilbert transform and fiber CD pre-compensation (hereinafter denoted as "HT+CD$^{-1}$") is shown in FIGS. 3A (module 301) and 3B (module 303), for 2λ×50 Gbps and 1λ×100 Gbps, respectively. The optical module can be implemented in a pluggable package of QSFP28, DD-QSFP, OSFP, CFP2, or CFP8, standards under industry MSA, although FIGS. 3A and 3B are each especially contemplated for use as a 100G QSFP28 modules. The dual-wavelength 2×50G optical transceiver 301 in FIG. 3A can be easily reduced to single-wavelength 50 Gbps QSFP or SFP optical transceiver modules for wireless front- or mid-haul, or passive optical network (PON) applications.

Referring to FIG. 3A, optical transceiver module 301 comprises 2×50 Gbps PAM4 DSP 311 which is connected on the receiving side to a 2 wavelength ROSA (Receiver Optical Subassembly) 313 that receives two wavelength split optical signals from demultiplexer 315 that is connected to an optical input 317 into the module. ROSA 313 generally comprises a photodetector (such as a PIN diode or APD (avalanche photodiode)) and a trans-impedance amplifier (TIA) for each of the wavelengths and converts the optical signals into electrical signal. Demultiplexer 315 can comprise gratings, filters, and/or a 1:2 Mach-Zehnder interferometer based demux. The transmission signals from PAM4 DSP 311 is directed to 2× analog EDPC 321, which can be two analog circuits, such as shown in FIGS. 1A and 1B. Pre-compensated signals from 2× analog EDPC to 2× MZM 323 that received optical input from a λ1 laser 325 and a λ2 laser 327 that are modulated and directed to output 329.

Referring to FIG. 3B, optical transceiver module 303 comprises 1×100 Gbps PAM4 DSP 331 which is connected on the receiving side to a 1 wavelength ROSA 333 that receives a one wavelength optical signal from an optical input 335 into the module. ROSA 333 generally comprises a photodetector (for example, PIN or APD), and a TIA for converting the one wavelength optical signal into an electrical signal. The transmission signals from PAM4 DSP 331 is directed to 1× analog EDPC 341, which can be an analog circuits, such as shown in FIG. 1A or 1B. Pre-compensated signals from 1× analog EDPC 341 to 1× MZM 343 that received optical input from a λ1 laser 345 that is modulated and directed to output 349.

To apply the CD pre-compensation along with the Hilbert transform, the following equations 9-12 replace the equations of FIG. 2 just based on the Hilbert transforms. For the two λ embodiment of FIG. 3A, $d_1$, $d_2$, $d_3$ and $d_4$ are used, and for the one λ embodiment of FIG. 3B, only $d_1$ and $d_2$ are used.

$$d_1 \propto [m_1(t) + \hat{m}_1(t)] \otimes F^{-1}(H^{-1}(f)) \quad (9)$$

$$d_2 \propto [-m_1(t) + \hat{m}_1(t)] \otimes F^{-1}(H^{-1}(f)) \quad (10)$$

$$d_3 \propto [m_2(t) + \hat{m}_2(t)] \otimes F^{-1}(H^{-1}(f)) \quad (11)$$

$$d_4 \propto [-m_2(t) + \hat{m}_2(t)] \otimes F^{-1}(H^{-1}(f)) \quad (12)$$

$$H^{-1}(f) = \begin{cases} \exp\left(\dfrac{-j\pi DL\lambda^2 f^2}{c}\right), & f \geq 0 \\ \exp\left(\dfrac{j\pi DL\lambda^2 f^2}{c}\right), & f < 0 \end{cases}$$

$F^{-1}$ = inverse Fourier transform

The analog circuit can be designed to perform approximately the desired transforms in Eqs. 9-12 through adjustment of the attenuated output from each tap for two FIR elements within the analog chip, one FIR for Eqs. (9) and (10) and one FIR for Eqs. (11) and (12). In transceiver embodiments supporting multiple simultaneous transmit wavelengths and/or transmit fibers, preferably the analog EDPC chip can comprise multiple FIR banks for simultaneously filtering multiple signal streams. For instance, in the example immediately above, the analog EDPC can have two parallel FIR banks, one for resolving Eqs. (9) and (10) against signal $m_1$, and another for resolving Eqs. (11) and (12) against signal m2. In particular the response of the FIR can be written as:

$$c(t) = \sum_{n=-N}^{N} c_n \delta(n\tau) \quad (13)$$

where c(t) is respectively set to equal $d_1$, $d_2$, $d_3$ and $d_4$, the δ represents a Dirac delta function, and where $c_n$ are the tap weights and τ is a delay period of the analog filter, e.g., T (FIG. 1A) or 2T/3 (FIG. 1B) (or other appropriate delays), T being the symbol rate. 2N+1 is equal to the number of taps. This relationship can be evaluated by simulation for a set number of taps, or approximated empirically corrected. The general theory of correction of communication distortions with electronic filters is described in Rudin, "Automatic equalization using transversal filters," IEEE Spectrum, January 1967, pp 53-59, incorporated herein by reference.

There can be one of two alternative structures 403, 405 of the dual-wavelength transmitter within optical transceiver module 301 (FIG. 3A), as shown in FIGS. 4A and 4B. The first structure, FIG. 4A, has an integrated optical combiner 407, so the output is connected to a single optical fiber 409, which in turn can be connected to a 40+-channel DWDM multiplexer with 100 GHz-spacing or to a remote receiver through a dark fiber. The second structure 405, FIG. 4B, has two transmitter output fibers 411, 413, which can be connected to two input ports of an 80+-channel DWDM multiplexer with 50 GHz-spacing. The 80+-channel DWDM multiplexer is generally composed of two 40+-channel DWDM multiplexer with even and odd (ITU-T) channels, respectively that can be combined by an interleaver.

Figure 5A:
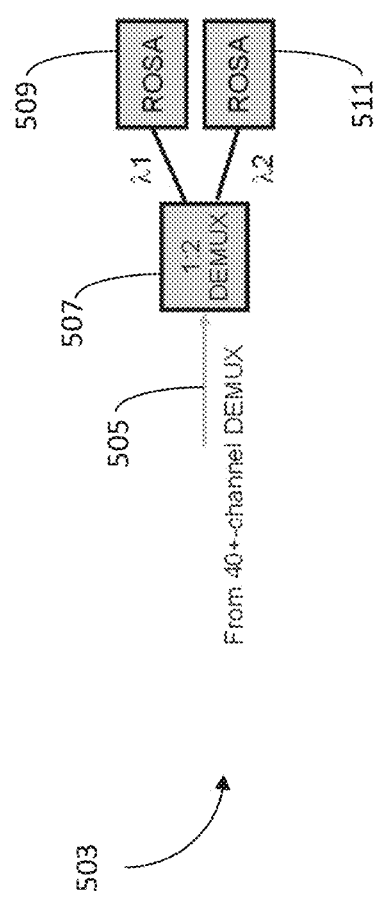
FIG. 5A diagrams an optical configuration of dual-wavelength receivers having optical input either presented combined on a single optical fiber.
Figure 5B:
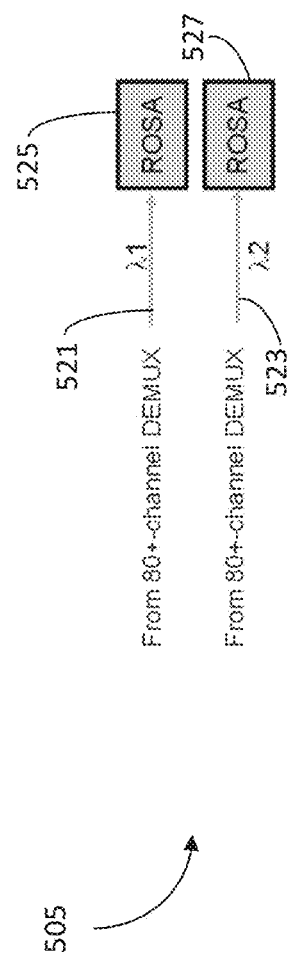
FIG. 5B diagrams an optical configuration of dual-wavelength receivers having optical input presented separately on individual input fibers.

Similarly, the dual-wavelength optical receiver of optical transceiver module 301 (FIG. 3A) can have one of two different alternative structures corresponding to the two transmitter structures, as shown in FIGS. 5A and 5B. The structure of FIG. 5A corresponds with the structure shown in FIG. 3A. For example, an optical input fiber 505 from a 40+ channel DEMUX is received by a two channel DEMUX 507, corresponding to demultiplexer 315 of FIG. 3. The λ1 output of two channel DEMUX 507 is directed to ROSA 509, and the λ2 output of two channel DEMUX 507 is directed to ROSA 511. Referring to FIG. 5B, separate optical fibers 521, 523, respectively carrying input at λ1 and at λ2, direct their respective inputs to ROSA 525 and ROSA 527. Input optical fibers 521, 523 can, for example, come from an 80+ channel DEMUX, which is generally composed of two 40+-channel DWDM demultiplexer with even and odd ITU-T channels, respectively, which can be combined by an interleaver.

Figure 6A:
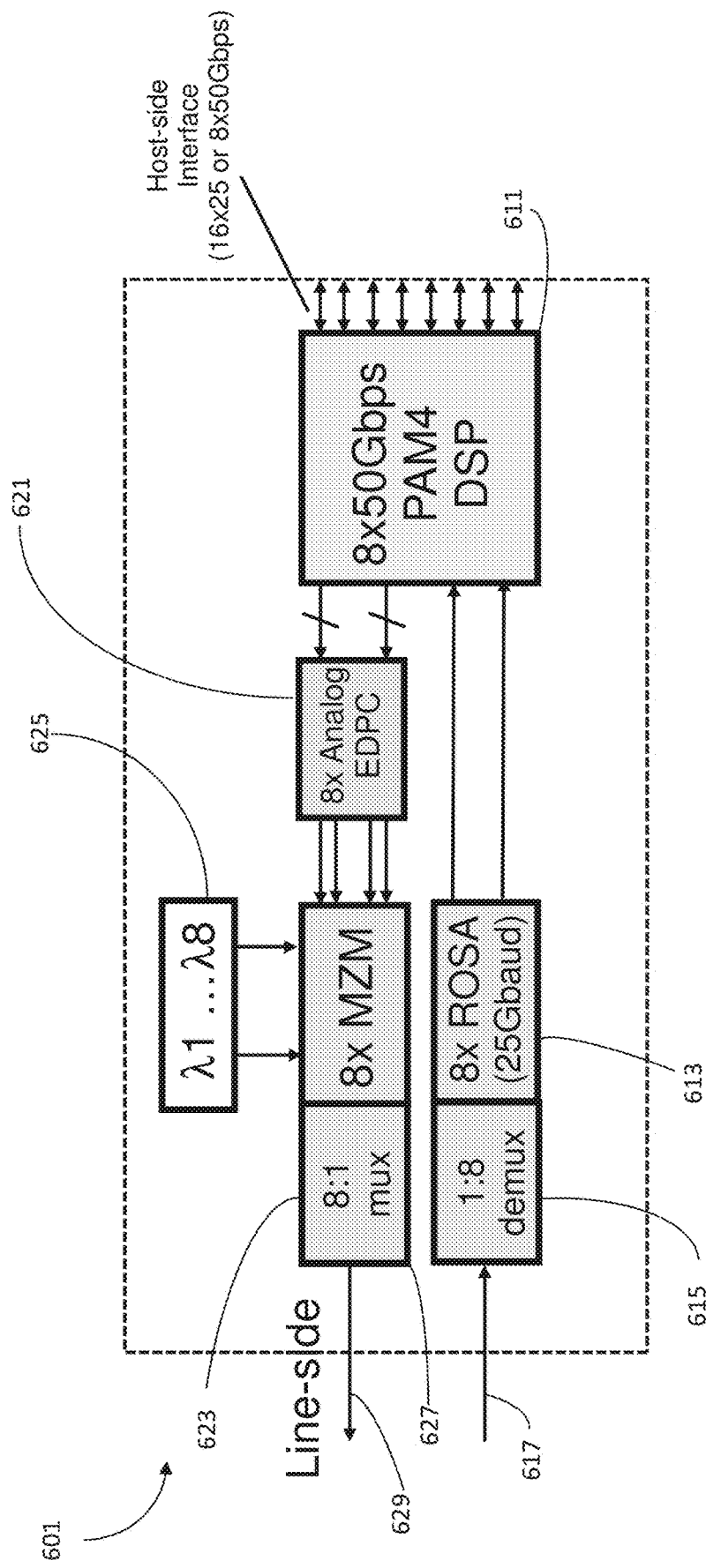
FIG. 6A depicts a block diagram for optical transceiver module to provide 400-Gbps links using PAM4 on eight 50-Gbps wavelengths.
Figure 6B:
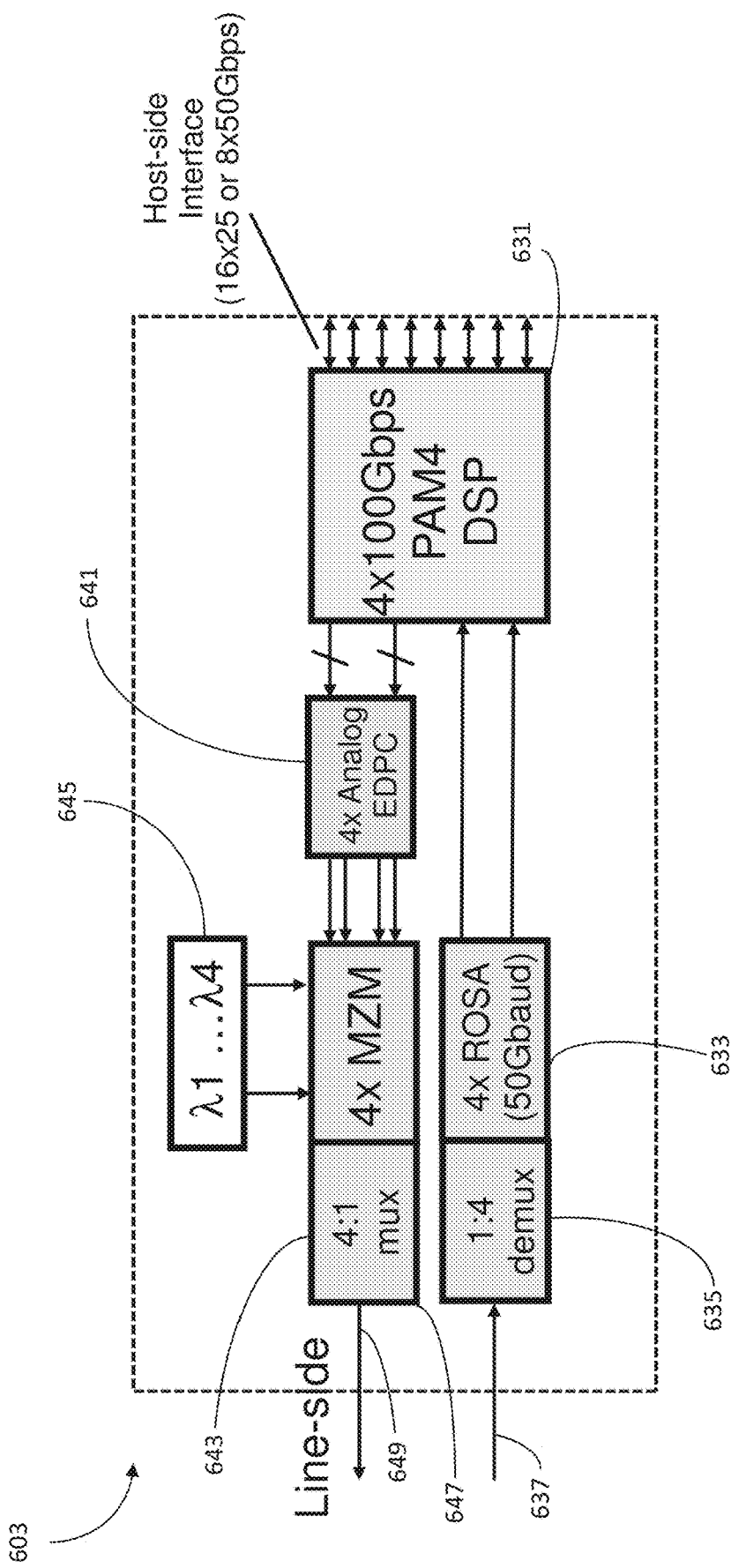
FIG. 6B depicts a block diagram for an optical transceiver module to provide 400-Gbps links using PAM4 on four 100-Gbps wavelengths.

The module concepts in FIGS. 3A and 3B can be extended to 400 Gbps DD-QSFP (or OSFP, CFP2, CFP8) transceiver modules by quadrupling the number of wavelengths, PAM4 channels, and analog Hilbert transformers, as shown in FIGS. 6A and 6B. Specifically, the optical transceiver modules 301, 303 in FIGS. 3A and 3B based on EDPC with Hilbert transform and fiber CD pre-compensation (hereinafter denoted as "HT+CD$^{-1}$") can be extended to 400 Gbps, for 8λ×50 Gbps and 4λ×100 Gbps, respectively. The optical module can be implemented in a pluggable package of QSFP28, DD-QSFP, OSFP, CFP2, or CFP8, standards under industry MSA, although FIGS. 6A and 6B are each especially contemplated for use as a 400G QSFP28 module.

Referring to FIG. 6A, optical transceiver module 601 comprises 8×50 Gbps PAM4 DSP 611 which is connected on the receiving side to an 8 wavelength ROSA (Receiver Optical Subassembly) 613 that receives 8 wavelength split optical signals from demultiplexer 615 that is connected to an optical input 617 into the module. ROSA 613 generally comprises a photodetector for each of the wavelengths and converts the optical signals into electrical signal. Demultiplexer 615 can comprise gratings, interference filters, and/or an AWG based demux. The transmission signals from PAM4 DSP 611 is directed to 8× analog EDPC 621, which can be eight analog circuits, such as shown in FIGS. 1A and 1B. Pre-compensated signals from 8× analog EDPC to 8× MZM 623 that received optical input from a group of eight (λ1 ... λ8) lasers 625 that are modulated by an eight channel multiplexer 627 and directed to output 629. Similar multiplexing elements can be used as described for the demultiplexing function.

Referring to FIG. 6B, optical transceiver module 603 comprises 4×100 Gbps PAM4 DSP 631 which is connected on the receiving side to a 4 wavelength ROSA 633 that receives a one wavelength optical signal from an optical input 635 into the module. ROSA 633 generally comprises a photodetector (for example, PIN or APD) and TIA for converting the one wavelength optical signal into an electrical signal. The transmission signals from PAM4 DSP 631 is directed to 4× analog EDPC 641, which can be an analog circuits, such as shown in FIGS. 1A and 1B. Pre-compensated signals from 4× analog EDPC 641 to 4× MZM 643 that received optical input from a group of four (λ1 ... λ4) lasers 645 that are modulated by a four channel multiplexer 647 and directed to output 649.

The N:1 mux and 1:N demux of the figures are just examples of multiple possible configurations. Also, a passive (fixed) dispersion compensation elements in the optical path after the mux. For the purposes of the figures, a passive dispersive compensation element can be considered within the box of the mux, although in an actual device it can be packaged separately. Also, with respect to embodiments where a mux is not shown, a passive dispersive element can be present with its location in the optical path essentially in the location of the mux without the multiplexing function. One can use combinations of Mx1 coupler and L:1 mux/demux to perform the same function. One can also use multiple TX fibers and RX fibers, and MPO (multi-fiber push on) connectors, in the case of DWDM applications.

In the module representations of the figures, all PAM4 DSP chips can be originally designed for short-haul (≤10 km) and low-power consumption, and generally comprise host-side SERDES (seralizer/deserializer), line-side forward error correction (FEC) encoder/decoder, line-side equalizers (such as CTLE, feed-forward and decision-feedback equalizers), MSB/LSB amplitude and skew adjustment, digital-to-analog converters (DACs) and analog-to-digital converters (ADCs), and many other functions. These PAM4 DSP chips could conceivably further be replaced by a simpler, analog-based implementation which does not require DAC and ADC. However, the number of feedforward equalizer taps in an analog PAM4 chip may not be large enough to obtain a strong post-compensation on the chromatic dispersion for a required transmission distance. Also, analog PAM4 chip usually does not contain an FEC. While we know that the higher the FEC coding gain and the stronger the equalizers (e.g., more taps), the longer the transmission distance can be. Given the maturity of the existing DSP-based PAM4 chips, it seems it would be generally preferable to use those for the transceiver modules described herein.

Iterative Tap Weight Optimization

The driving signals using $HT+CD^{-1}$ tap weights shown in Eqs. (5)-(8) are based on theoretical calculations. In practice, the transmitter and receiver bandwidths can also affect the performance. Therefore, based on a configurable FIR filter, we can use the calculated $HT+CD^{-1}$ tap weights as the initial condition and seek improved tap weights that can simultaneously also compensate for both transmitter and receiver bandwidth limitations through a convergence procedure. The adjustment of the amplifier/attenuator outputs are used to adjust the tap weights.

The performance of the tap weights optimized for a certain target distance may degrade rapidly when actual distance differs from the optimization target. In order to obtain single set of tap weights operating in a wide range of transmission distances, the procedure that performs joint optimization for several transmission distances (or fiber lengths) in the desired range is proposed here. Note that this procedure can be used for optimization for single transmission distance as well.

Figure 7:
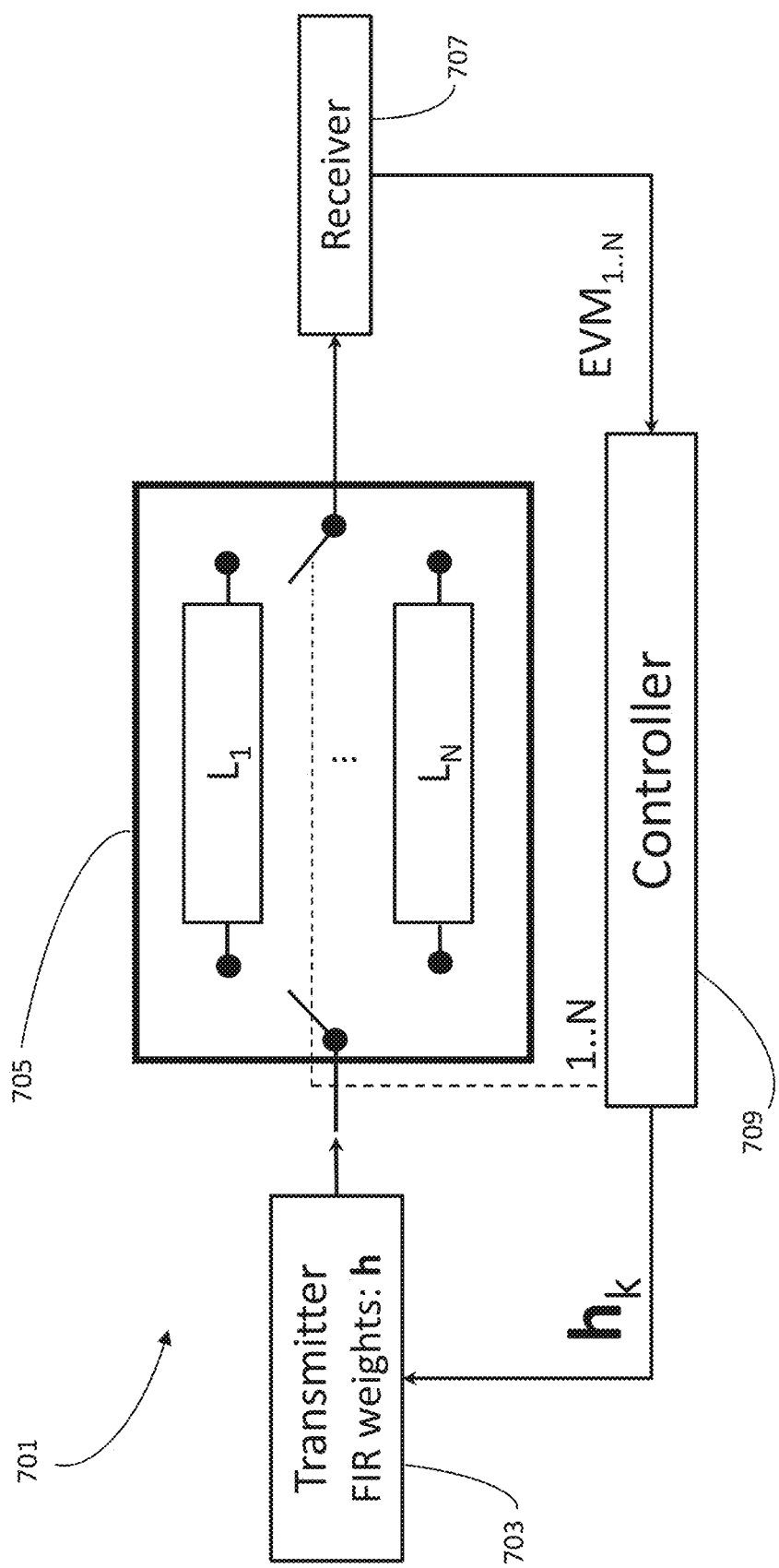
FIG. 7 depicts a communication plant for determining optimal tap-weight parameters for an optical data link.

The search algorithm uses a weighted sum of EVMs (Error Vector Magnitudes) obtained after transmitting the test signal through the set of fibers of length $L_1, \ldots L_N$ as an optimization metric J.

$$J = \sum_{n=1}^{N} w_n \cdot EVM_n, \tag{14}$$

where $w_n$ are arbitrary weights that could be adjusted to achieve the desired EVM versus distance profile. A schematic diagram of the architecture of a system 701 for implementing the iterative tap weight optimization is depicted in FIG. 7. Transmitter 703 can be one of the transmitter components of the transceivers described herein. Transmitter 703 subsequently outputs light into optical fibers from the optical fiber bank 705 which deliver light to receiver 707. Receiver 707 calculates the EVM using a suitable processor, and the EVM is transmitted to a controller 709 connected to both transmitter 703 and receiver 707. For convenience, controller 709 can be used during the manufacturing/configuration process of preparing the transceiver and may be an analog circuit, digital processor or a combination of the two. Controller 709 can be used to configure the FIR and would then not generally be used by the ultimate user, although a controller 709 can be used to reconfigure the FIR during a subsequent time after a period of use.

Figure 8:
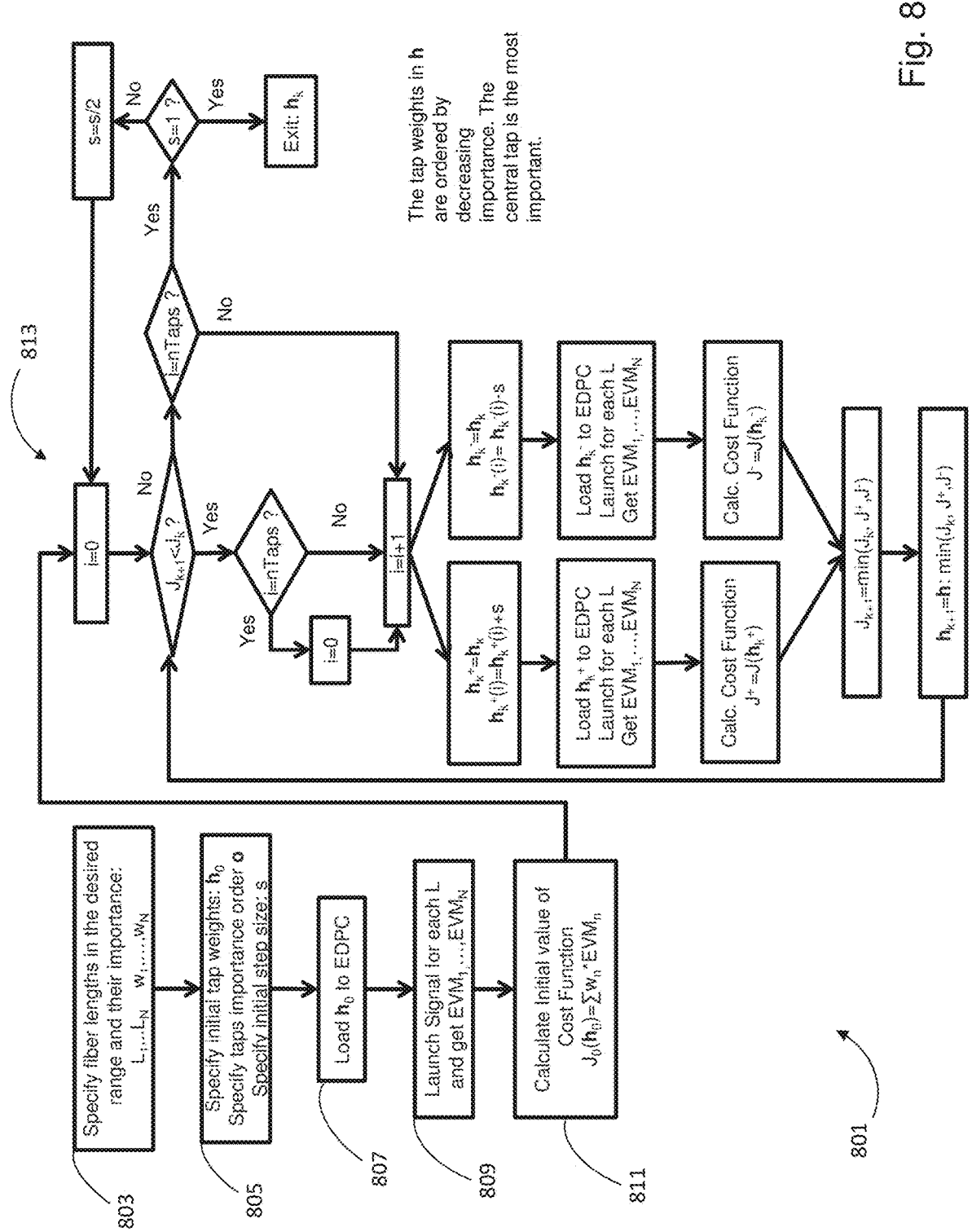
FIG. 8 presents a flowchart of a preferred optimization procedure for the communication plant of FIG. 7.

Note that in a production line, a programmable dispersion compensator could be used to emulate the CD as an alternative to the bank of physical optical fiber links with a length of $L_1, \ldots L_N$. For the description of a programmable dispersion compensator, see for example U.S. Pat. No. 6,879,426 to Weiner, entitled "System and Method for Programmable Polarization-Independent Phase Compensation of Optical Signals," incorporated herein by reference. For an EDPC with n-taps, the optimum taps search is an n-dimensional optimization problem that generally could be solved by one of the known search methods such as the steepest descent. In a practical device, the number of taps may be small n≤5, and their values have to be specified as an integer in the limited range (in the device of the subsequently-described experiment it is an integer between −100 and 100). For such a case one might well use the simplified search procedure depicted in the flow-chart of FIG. 8.

It is convenient to consider the tap weights as a vector h which is formed by concatenating the tap weights required to produce signals $d_1$ (Eq. (9)) and $d_2$ (Eq. (10)) respectively. For instance, consider the EDPC with five analog taps. Then tap weighs producing the signal $d_1$ are $[I_1\ I_2\ I_3\ I_4\ I_5]$, and the tap weighs producing the signal $d_2$ are $[Q_1\ Q_2\ Q_3\ Q_4\ Q_5]$. The vector h is then $[I_1\ I_3\ I_2\ I_4\ I_5\ Q_1\ Q_2\ Q_3\ Q_4\ Q_5]$. It was observed that change of the tap weights that are in the middle has greater effect on EDPC performance than change of the outer ones. Therefore it is preferable to adjust tap weights in the order of their importance. To achieve this it is convenient to sort vector h in order of decreasing importance. $h=[I_3\ Q_3\ I_2\ Q_2\ I_4\ Q_4\ I_1\ Q_1\ I_5\ Q_5]$ and then adjust the elements of h from first to last. The optimum taps are searched iteratively. Initially the controller loads the EDPC with the tap weights that are calculated analytically as the convolution of the Hilbert transform and CD pre-compensation weights corresponding to one of the target fiber lengths L. Then the signal is subsequently launched to each fiber from the optimization target fibers set and EVM values are obtained by the controller from the receiver. The optimization cost function is calculated by the controller in accordance with Eq. (14).

Whether or not J is emulated from a programmable dispersion compensator or measured using a bank of fiber lengths connected to an optical receiver, similar iterative processes can be used. Referring to the iterative process 801 in FIG. 8, a set of fiber lengths in the desired range are specified 803 ($L_1, \ldots, L_N$) and their importance ($w_1, \ldots, w_N$), as described above in the context of Eq. (14). Then, initial tap weights are specified 805 in their order of important as indicated in the previous paragraph along with a step size s, which can be selected by the user as a reasonable initial value. As is true of most stochastic-convergence optimization processes, the initial value of step size will impact the balance between speed and quality of convergence towards optimum results. For a given setup, it is generally necessary to evaluate different initial step sizes against the desired qualities to determine a preferred value or range. Vector $h_0$ is loaded 807 to EDPC. The signal is launched 809 for each L to obtain $EVM_1, \ldots, EVM_N$. Using these values, initial values are calculated 811 of the cost function $J_0(h_0)$.

On each iteration k (813 of FIG. 8), the controller produces two test tap weights sets $h^+$ and $h^-$ by respectively increasing and decreasing one of the tap weights by the value specified as step-size s. Then the three cost functions J, $J^+$, and $J^-$ corresponding to vectors h, $h^+$ and $h^-$ are obtained by loading the tap weights vectors to the EDPC, launching the test signals for each fiber lengths $L_{1\ldots N}$ and summing the obtained EVMs in accordance with Eq. (14). Next, the cost function values are compared and the smallest one with the corresponding h are selected to be used in the next iteration. Iterations continue until the cost function stops decreasing. The iteration steps through each tap separately, with the parameter "i" counting the taps. In this case the step size s is halved and the iterations resume. This cycle continues until the step size becomes equal to 1.

The proposed search procedure has been validated by simulation of the resulting EDPC in an optical link.

Figure 9A:
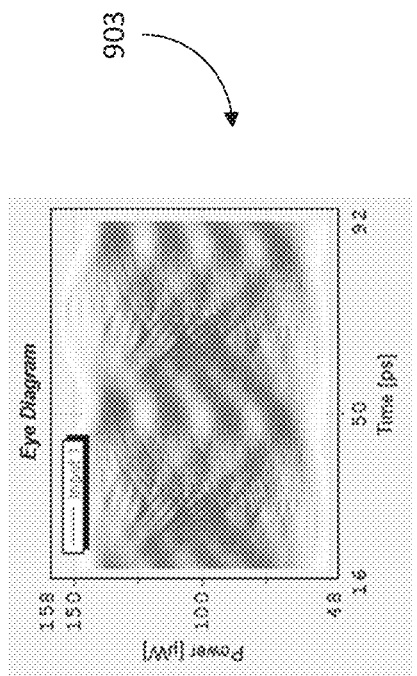
FIG. 9A depicts a simulated transmitted optical EYE diagram by a transmitter with EDPC tap weights obtained by the computed convolution of Hilbert transform and dispersion pre-compensation for 10 km of fiber.
Figure 9B:
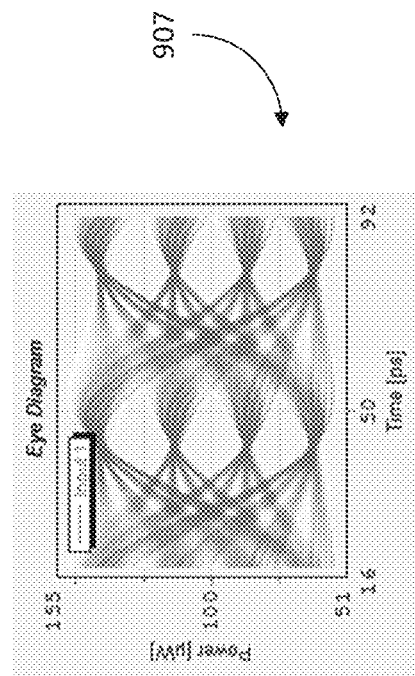
FIG. 9B depicts the received signal levels of the transmitted signal of FIG. 9A prior to being processed by the DSP.
Figure 9C:
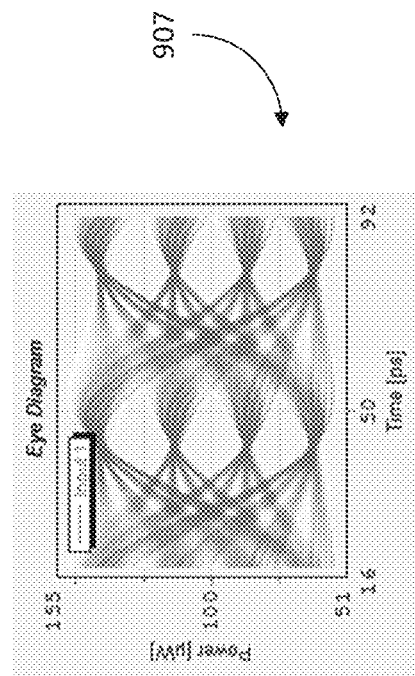
FIG. 9C depicts a simulated transmitted optical EYE diagram by a transmitter with EDPC tap weights optimized by the algorithm of FIG. 8.
Figure 9D:
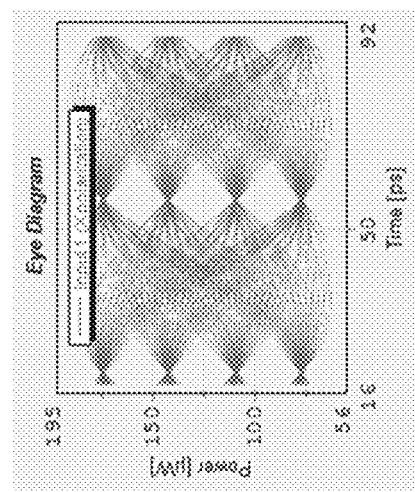
FIG. 9D depicts the received signal levels of the transmitted signal of FIG. 9C prior to being processed by the DSP.

FIG. 9A shows simulated transmitted optical EYE diagram produced by the transmitter with EDPC tap weights obtained by the computed convolution of the Hilbert transform and dispersion pre-compensation for 10 km of fiber, with a target transmission distance of 20 km (i.e. no iterative optimization). Since the deterministic filter was calculated for 10 km, it would be expected to see an open EYE diagram after 10 km transmission even without the Rx adaptive equalizer. Therefore, FIG. 9B shows the EYE diagram of the received signal levels prior to being processed by the DSP, and it can be seen that the EYEs are barely but still open. Note that if the same pre-compensated optical signals were transmitted over 20 km of the fiber, one would not see any open EYE prior to the DSP because the transmitted signal has been pre-compensated for only half of that distance; and therefore the residual 10 km dispersion would wash out the open EYE. In FIGS. 9C and 9D the transmitted and received EYE diagrams are shown when the optimized taps (obtained through the search algorithm in FIG. 8) are used. We can see a clear improvement of EYE diagrams over those of FIGS. 9A and 9B.

Based on the preceding, one can find a set of tap weights that is applicable to any distance within 40 km (when only 5 EDPC taps are used) with use of a short-haul PAM4 DSP chip. This set of tap weights is found by setting L=20 km and an initial set of weights based on Hilbert transform and CD pre-compensation (HT+CD$^{-1}$), and subsequently an optimized set of weights found by iterative search as so described. In cases where the link performance would be sub-optimum using this single set of tap weights, we can alternatively use two sets of tap weights and select the best as part of the link initialization. In this case, the first tap weights are found by, for instance, setting L=10 km (refining the actual tap weights as previously described) to cover a distance between 0 and 20 km.; and similarly determining a second set of tap weights by refining around L=30 km to cover a distance between 20 and 40 km. These two sets of tap weights can be saved in the transceiver configuration memory, and the suitable settings for optimum performance can be selected when the transceiver is enabled on an actual fiber plant. Depending on the power consumption requirement, one can use more taps to further improve the link BER performance or to increase the transmission distance. For example, the 5 taps shown in FIG. 1 can be increased to 7 or 9 taps.

PAM4 ODSB

Above, the described transceiver embodiments have all been based on OSSB transmission. For certain considerations, it may be preferable to utilize conventional optical double-sideband (ODSB) transmission. For these embodiments, the Hilbert transform is not performed. In a further embodiment of the transceiver, the EDPC chip can also be advantageously utilized in an ODSB signal transmission. The driving signals to the two MZI electrodes are $$d_1 \propto \mathrm{Re}[m(t) \otimes F^{-1}(H^{-1}(f))] \quad (14)$$

$$d_2 \propto \mathrm{In}[m(t) \otimes F^{-1}(H^{-1}(f))] \quad (15)$$

where $$H^{-1}(f) = \exp\left(\frac{-j\pi D L \lambda^2 f^2}{c}\right)$$

Figure 2B:
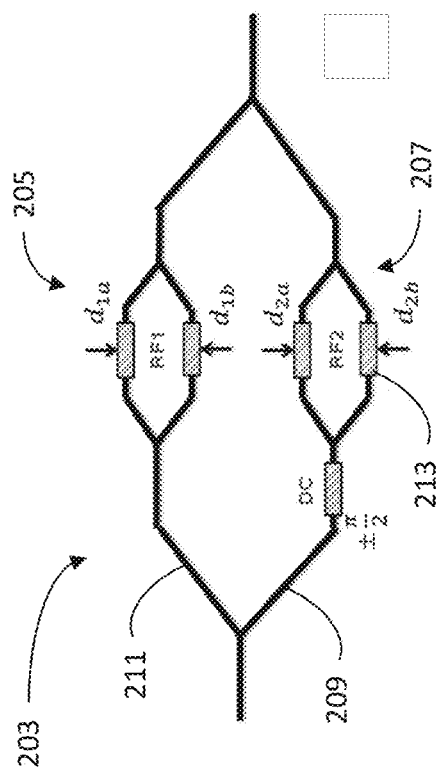
FIG. 2B depicts an optical Mach-Zehnder modulator configuration for providing SSB modulation using IQ drive capabilities, where $d_{1a}=-d_{1b}$, $d_{2a}=-d_{2b}$ and $d_1$ and $d_2$ are independent.

The same principle can be applied to optical transceivers whose line-side optics are based on 1×100 G, 8×50 G, or 4×100 G, etc. The optimization procedure for tap weights can still follow that in FIG. 8. Generally speaking, at a specific distance, ODSB-PAM4 transceiver can achieve a lower raw error rate than that of an OSSB-PAM4. However, the optimized tap weights for ODSB-PAM4 cannot cover as wide a range of transmission distances as for OSSB-PAM4. As a result, more tap weight sets for different distance ranges would need to be stored in the transceiver memory, which may not be operationally convenient for service providers.
Experimental Results A live experiment was configured following the optical transceiver configuration shown in FIG. 3A, though only one of the two wavelengths was activated to demonstrate the invention. A commercial short-haul PAM4 DSP (which converts host-side 4×25 Gbps to line-side 2×50 Gbps) was used for the experiment. The EDPC chip was an analog transversal filter fabricated on the IBM 90 nm 9HP SiGe BiCMOS process and having a cutoff frequency of 300 GHz [12]. The MZM structure was as shown in FIG. 2B.

Figure 10A:
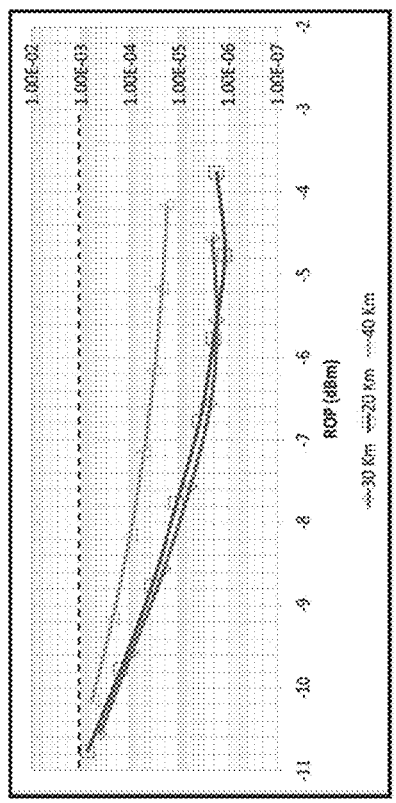
FIG. 10A is a graph of experimental results for one of the 50-Gbps wavelengths of the embodiment depicted in FIG. 3A.

After a direct 40 km fiber link with no optical dispersion compensation, we obtained the bit-error-rate (BER) as a function of the received optical power shown in FIG. 10A. We can see in this figure that a receiver sensitivity (minimum received optical power to remain below $10^{-3}$ raw error rate) of <−10.5 dBm after 40 km, and <−11 dBm after 20/30 km is achievable, when the pre-FEC BER threshold is set at 1e-3 (determined by the PAM4 DSP chip used in the experiment). The receiver sensitivity can be further improved by replacing the older TIA in our experiment (which has a spectral noise density of 17 pA/$\sqrt{Hz}$) with a state-of-the-art TIA with a spectral noise density of 12 pA/$\sqrt{Hz}$.

Figure 10B:
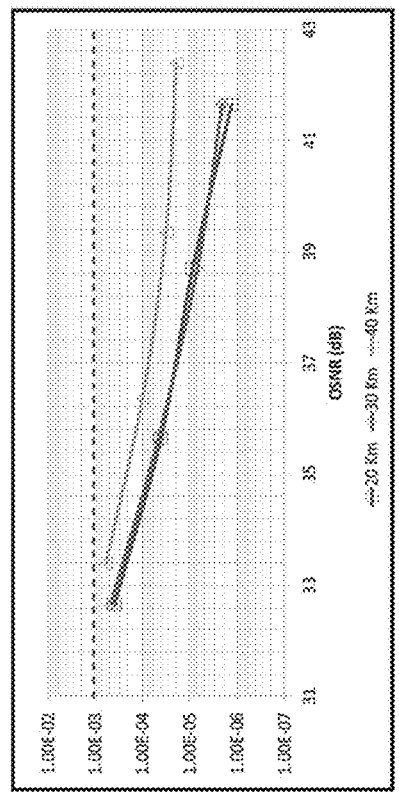
FIG. 10B is a graph of experimental results as a function of optical signal to noise ratio for one of the 50-Gbps wavelengths of the embodiment depicted in FIG. 3A.

For a DWDM system with a DWDM booster amplifier and pre-amplifier, we have also measured the BER performance as a function of optical signal to noise ratio (OSNR), as shown in FIG. 10B. We can see in this figure that a required OSNR of <33 dB after 40 km, and <32 dB after 20/30 km was achievable, when the pre-FEC BER threshold was set at 1e-3 (shown by the black dashed line).

References Cited Above in Square Brackets, Which are Incorporated herein by Reference:

[1] http://100glambda.com/specifications
[2] IEEE802.3bsTM/D3.5
[3] N. Eiselt, et al., "Evaluation of Real-Time 8×56.25 Gbps (400 G) PAM-4 for Inter-Data Center Application Over 80 km of SSMF at 1550 nm", J. Lightwave Tech., 35(4), 955-962, 2017.
[4] S. Yin, et al., "100-km DWDM Transmission of 56-Gbps PAM4 per λ via Tunable Laser and 10-Gbps InP MZM", Photon. Tech. Lett., 27(24), 2531-2534, 2015.
[5] U.S. Pat. No. 9,722,722 B2, Aug. 1, 2017.
[6] U.S. Pat. No. 9,553,670 B2, Jan. 24, 2017.
[7] M. Morsy and D. V. Plant, "A comparative study of technology options for next generation intra- and inter-datacenter interconnects", W4E.1, Optical Fiber Communication Conference 2018.
[8] M. Sieben, et al., "Optical Single Sideband Transmission at 10 Gbps Using Only Electrical Dispersion Compensation", J. Lightwave Tech., p. 1742-1749, vol. 17, No. 10, October 1999.
[9] U.S. Pat. No. 5,880,870, Mar. 9, 1999.
[10] U.S. Pat. No. 7,206,520 B2, Apr. 17, 2007.
[11] L. R. Rabiner and R. W. Schafer, "On the behavior of minimax FIR digital Hilbert transformers," Bell System Tech. J., vol. 53, no. 2, pp. 363-390, February 1974.
[12] Edem Ibragimov, et. al., "Coherent Analog Low Power, Small Size 400/200/100 GB/s Receiver Based on Bipolar SiGe Technology", Th1A.5, Optical Fiber Communication Conference 2018.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understood that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated.

What is claimed is:

1. An optical transceiver module for n-level pulse-amplitude modulated (PAMn) optical symbols with n≥2, providing an interface between electronic data signals on a host and optical symbols transmitted through an optical-communication plant at a Baud rate, the transceiver comprising:
receiver section that comprises at least one photoreceiver to convert received optical intensity signals into analog electrical signals;
a PAMn digital signal processing (DSP) circuit providing at least logical interface to the electronic host data, forward error correction (FEC) capabilities, analog-to-digital conversion of the electrical signals from the photoreceiver(s), digital adaptive filtering of the converted received signal(s), and reconstruction of the filtered received signal(s) into data;
a transmitter section that comprises at least one laser and at least one interference modulator; and
an analog transversal filter circuit configured as an electronic dispersion pre compensator (EDPC) to filter PAMn transmission signals provided by the PAMn DSP based on anticipated direct detection of the PAMn transmission signals,
wherein the filtered signals emitted from the EDPC are connected to signal inputs of the interference modulator, wherein the EDPC effects a distortion pre-correction based on a predicted distortion for a direct detected signal.

2. The optical transceiver module of claim 1 wherein the EDPC filter circuit comprises a finite impulse response filter comprising at least three taps, amplifiers/attenuators adjusting the tap weight, and an electrical combiner to combine the signals from the taps.

3. The optical transceiver module of claim 2 wherein the at least three taps are 5 taps, 7 taps, or 9 taps.

4. The optical transceiver module of claim 2 wherein amplifiers/attenuators are field programmable.

5. The optical transceiver module of claim 2 wherein the EDPC further comprises an integrated driver for the output from the electrical combiner, the driver output power rating being sufficient to directly drive the interference modulator.

6. The optical transceiver module of claim 1 wherein the EDPC effects an approximate Hilbert transform on the analog signal.

7. The optical transceiver module of claim 1 wherein the predicted distortion corresponds to a multiple of half the maximum correction length provided by the receiver.

8. The optical transceiver module of claim 7 wherein the distortion pre-correction is selected from a pre-stored collection of tap weights wherein members of the collection represent different multiples of half the maximum.

9. The optical transceiver module of claim 7 wherein the EDPC also effects an approximate Hilbert transformation.

10. The optical transceiver module of claim 1 wherein the PAMn DSP is a PAM4 chip designed for a MSA standard of Table 1.

11. The optical transceiver module of claim 1 wherein the PAM optical signals convey (m≥1)*50 Gbps per wavelength•channel data streams and the module is functionally housed in a standard QSFP28, DD-QSFP, OSFP, CFP2, or CFP8 pluggable package.

12. The optical transceiver module of claim 1 wherein the interference modulator is a DDMZM and wherein two modulator signals are provided from the EDPC to the two DDMZM arms.

13. The optical transceiver module of claim 1 wherein the interference modulator is an IQ nested MZM and wherein four modulator signals are provided from the EDPC to the four MZM arms of the IQ nested MZM.

14. The optical transceiver module of claim 1 further comprising a fixed dispersion-compensation module to provide a range of applicable distances having a maximum distance longer than the span of the range.

15. The optical transceiver module of claim 1 wherein the EDPC performs an approximate Hilbert transform on the analog signal and distortion pre-correction based on a predicted distortion corresponding to a selected transmission length, wherein the EDPC outputs a signal proportional to $m(t)+\hat{m}(t)$ and a signal proportional to $m(t)+\hat{m}(t)$, and wherein the EDPC filter circuit comprises a finite impulse response filter comprising at least three taps, amplifiers/attenuators adjusting the tap weight, and an electrical combiner to combine the signals from the taps for each of the $m(t)+\hat{m}(t)$ signal and the $-m(t)+\hat{m}(t)$ signal.

16. The optical transceiver module of claim 1 wherein the EDPC provides for a maximum fiber length that is the sum of the EDPC pre-compensation length and the maximum compensation length of the PAMn DSP.

17. A method for determining the tap weights of an analog transversal filter circuit configured to condition an analog modulator signal from the PAMn processor to perform an approximate Hilbert transform, dispersion pre-compensation, or both to form a conditioned modulator signal, the method comprising:

iteratively correcting the tap weights, based on a weighted average of errors from a plurality of fiber lengths, involved in providing a modulated output optical signal to improve the dispersion for a composite range over the plurality of fiber lengths transmitting the optical signal for direct detection at a receiver wherein the procedure is performed based on a set of selected fiber lengths in the desired range specified as $(L_1, \ldots, L_N, N>1)$.

18. The method of claim 17 wherein the iterative corrections are performed through error vector magnitude measurements of an optical receiver positioned at the target distance of each fiber length.

19. The method of claim 18 wherein an optimization metric is evaluated by sending a signal for a test of the tap weights through a set of fibers with the selected lengths $(L_1, \ldots, L_N)$.

20. The method of claim 18 wherein an optimization metric is evaluated with a programmable dispersion compensator based on test tap weights and the selected lengths $(L_1, \ldots, L_N)$.

21. The method of claim 17 wherein tap-weight settings are determined for multiple distinct composite ranges of fiber lengths and said the settings for each length composite range are stored in an optical transceiver's digital memory as members of a collection for operative selection.

* * * * *

UNITED STATES PATENT AND TRADEMARK OFFICE
CERTIFICATE OF CORRECTION

PATENT NO. : 11,418,259 B2
APPLICATION NO. : 17/116658
DATED : August 16, 2022
INVENTOR(S) : Winston I. Way, Raghavendra V. Juluri and Konstantin Gennadiyevich Kuzmin It is certified that error appears in the above-identified patent and that said Letters Patent is hereby corrected as shown below:

In the Claims

In Column 19, Claim 15, Line 28, 2nd formula delete "$m(t)+\hat{m}(t)$," and insert -- $-m(t) + \hat{m}(t)$, --, therefor.

Signed and Sealed this
Twenty-fifth Day of October, 2022

Katherine Kelly Vidal
*Director of the United States Patent and Trademark Office*